(12) United States Patent
Mochizuki et al.

(10) Patent No.: US 9,639,990 B2
(45) Date of Patent: May 2, 2017

(54) DISPLAY CONTROL APPARATUS, COMPUTER-IMPLEMENTED METHOD, STORAGE MEDIUM, AND PROJECTION APPARATUS

(71) Applicant: Panasonic Intellectual Property Management Co., Ltd., Osaka (JP)

(72) Inventors: Makoto Mochizuki, Kanagawa (JP); Shigeru Kobayashi, Tokyo (JP); Koichi Emura, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 199 days.

(21) Appl. No.: 14/499,608

(22) Filed: Sep. 29, 2014

(65) Prior Publication Data

US 2015/0097866 A1    Apr. 9, 2015

(30) Foreign Application Priority Data

Oct. 3, 2013  (JP) .................................. 2013-208300

(51) Int. Cl.
*G06T 19/00*    (2011.01)
*B60R 11/04*    (2006.01)
(Continued)

(52) U.S. Cl.
CPC ............ *G06T 19/006* (2013.01); *B60R 11/04* (2013.01); *G02B 27/01* (2013.01); *G02B 27/017* (2013.01);
(Continued)

(58) Field of Classification Search
None
See application file for complete search history.

(56) References Cited

U.S. PATENT DOCUMENTS

2005/0154505 A1* 7/2005 Nakamura ........... G01C 21/365
                                                           701/1
2006/0022808 A1* 2/2006 Ito ......................... G08G 1/167
                                                           340/425.5

FOREIGN PATENT DOCUMENTS

JP    2011-002660    1/2011
WO    2013/069189    5/2013

OTHER PUBLICATIONS

Silva, R., Jauvane C. Oliveira, and Gilson A. Giraldi. "Introduction to augmented reality." National Laboratory for Scientific Computation, Av. Getulio Vargas (2003).*

(Continued)

*Primary Examiner* — Abderrahim Merouan
*Assistant Examiner* — Nurun N Flora
(74) *Attorney, Agent, or Firm* — Greenblum & Bernstein, P.L.C.

(57) ABSTRACT

In a display control apparatus configured to control image data displayed on a predetermined display medium, an information acquisition unit acquires a first information associated with the predetermined matter at a first time and acquire a second information associated with the predetermined matter at a second time after the first time. A determination unit judges whether there is a predetermined change between the first information and the second information. A control unit controls the image data such that in a case where a predetermined change is detected, at least one of parameters including a location, a size, and a shape of a restricted area, in which the displaying of display information including in the image data is limited, is changed so as to achieve the parameter defined in relation to the second information.

19 Claims, 15 Drawing Sheets

(51) Int. Cl.
H04N 7/18 (2006.01)
G02B 27/01 (2006.01)
(52) U.S. Cl.
CPC ......... *H04N 7/18* (2013.01); *G02B 2027/014* (2013.01); *G02B 2027/0178* (2013.01); *G02B 2027/0187* (2013.01)

(56) References Cited

OTHER PUBLICATIONS

Narzt, Wolfgang, et al. "Augmented reality navigation systems." Universal Access in the Information Society 4.3 (2006): 177-187.*
Van Krevelen, D. W. F., and R. Poelman. "A survey of augmented reality technologies, applications and limitations." International Journal of Virtual Reality 9.2 (2010): 1.*
Hye Sun Park et.al., "In-Vehicle AR-HUD System to Provide Driving-Safety Information", ETRI Journal, vol. 35, No. 6, Dec. 2013.
The Extended European Search Report dated Oct. 5, 2015 for the related European Patent Application No. 14187772.0.

* cited by examiner

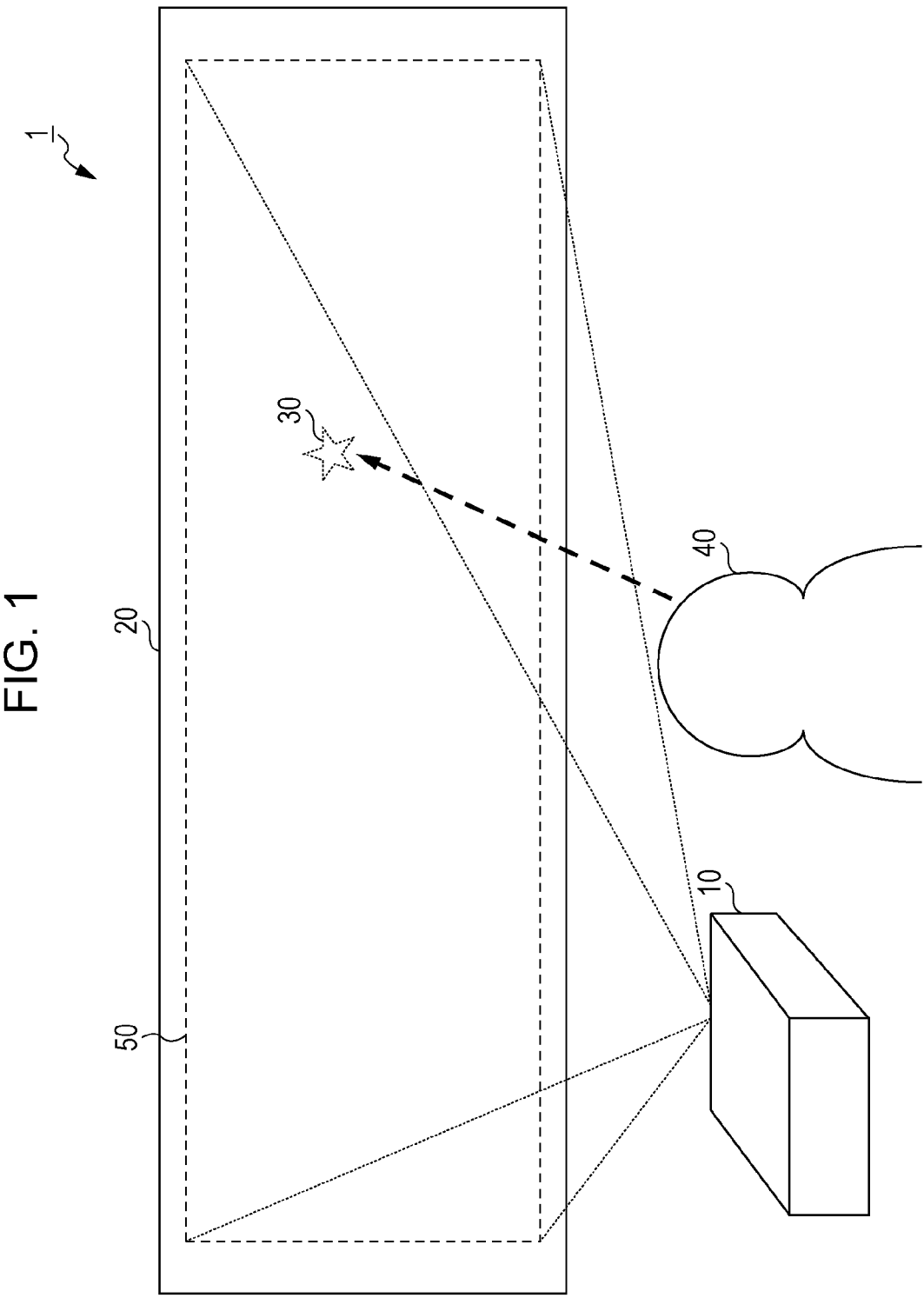

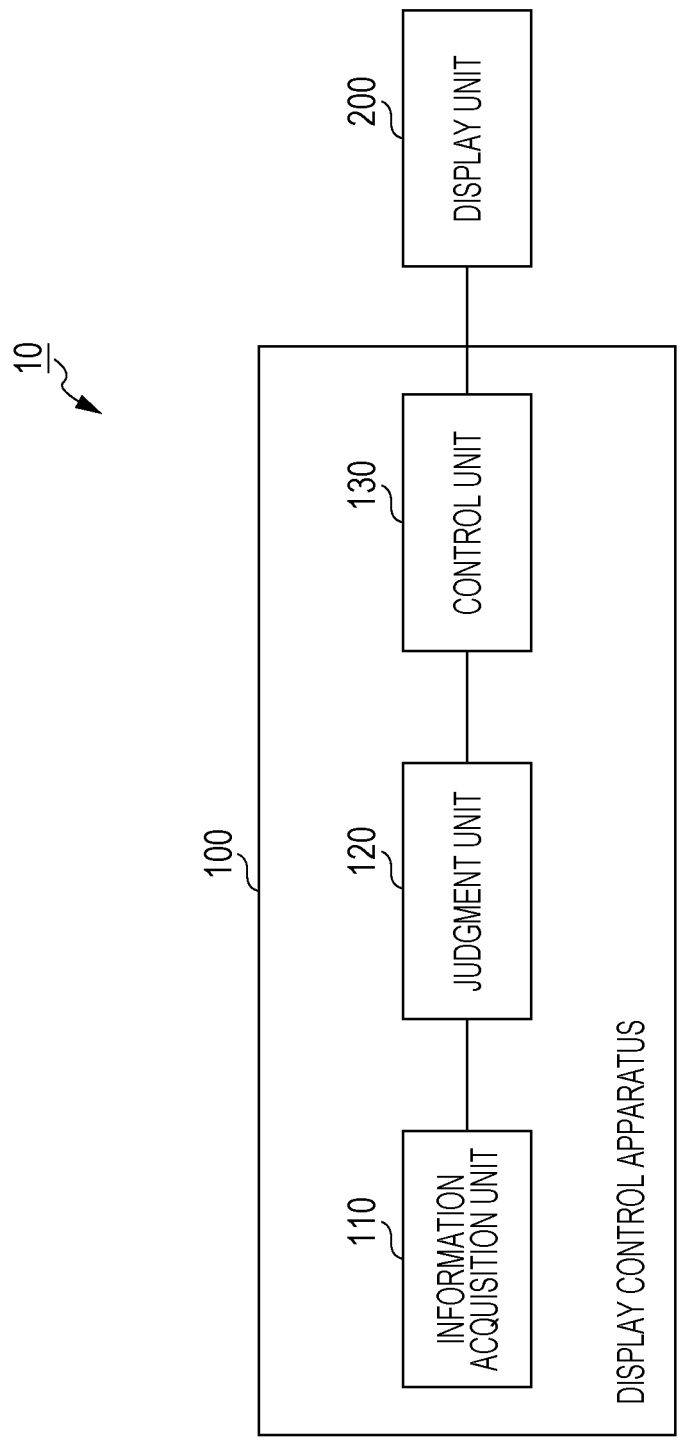

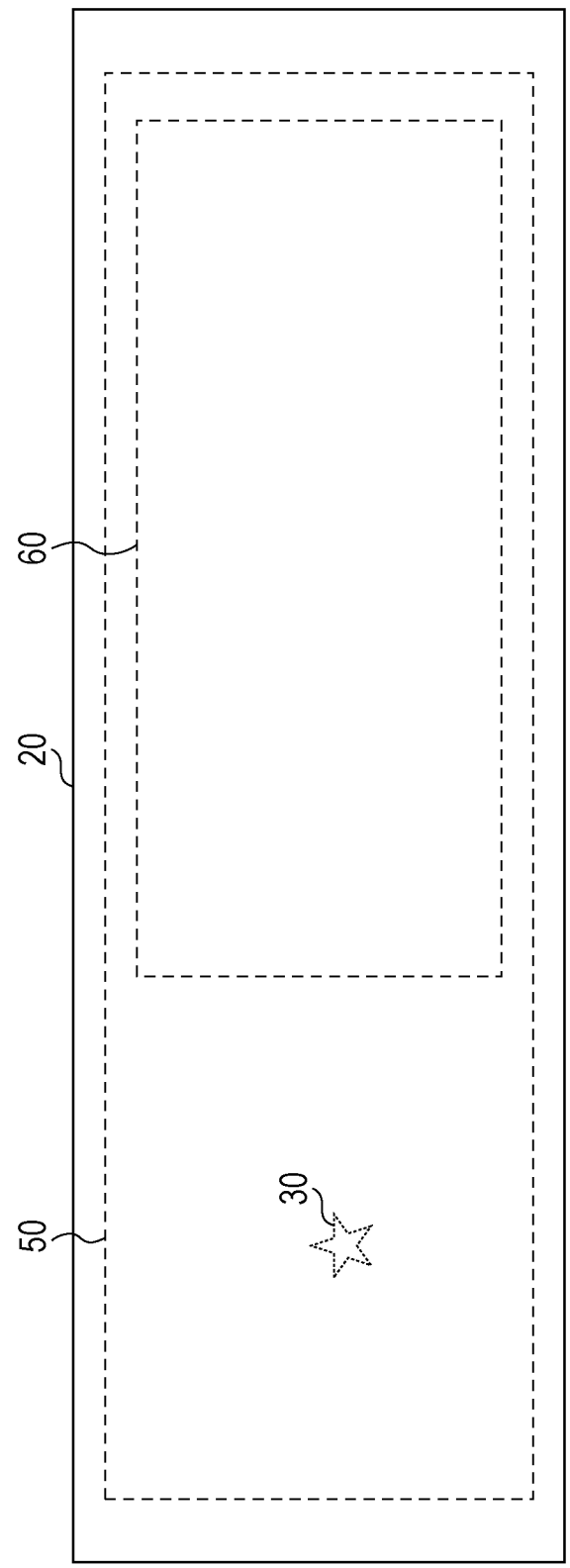

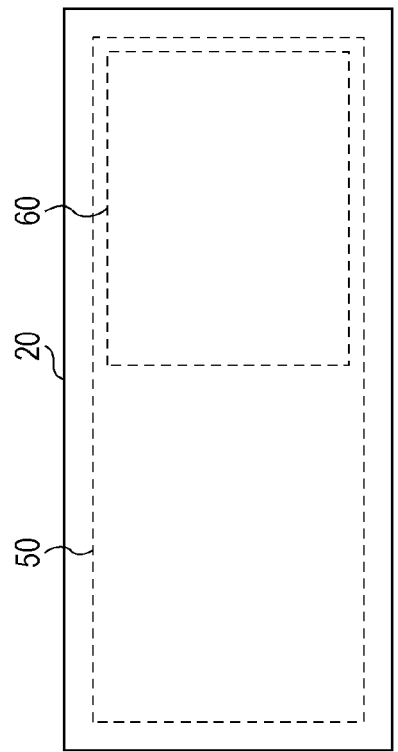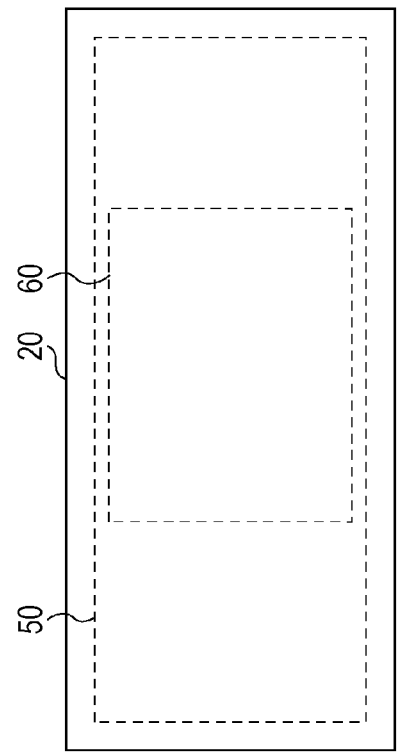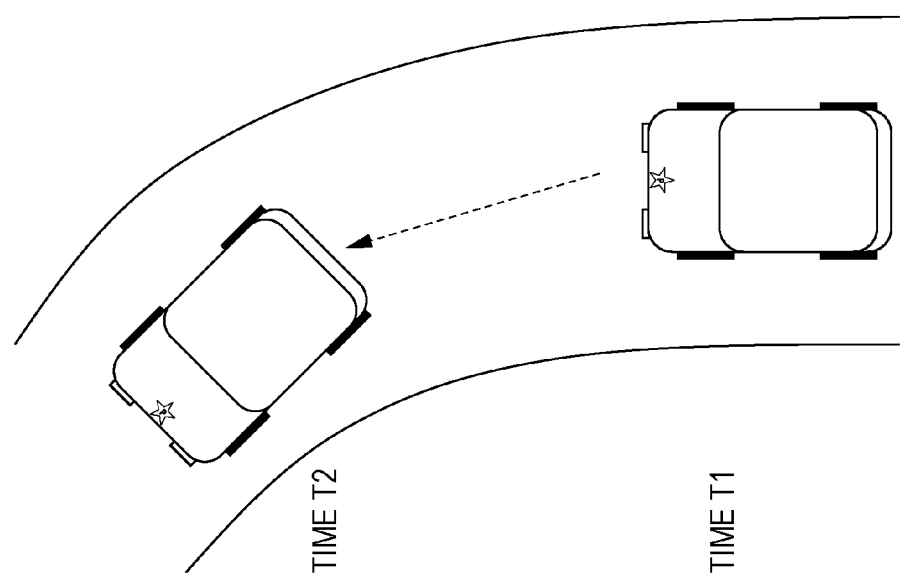

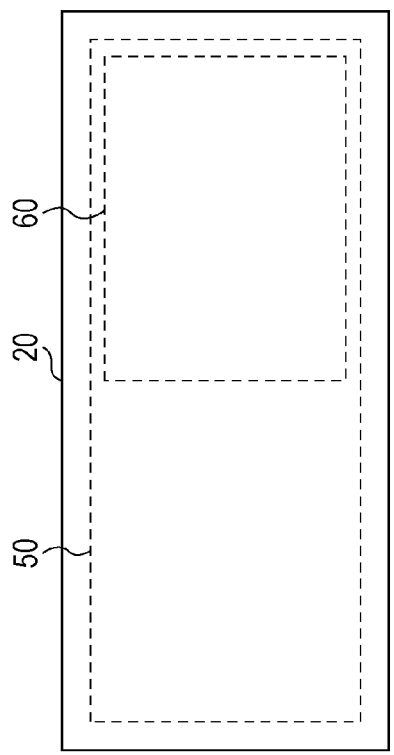
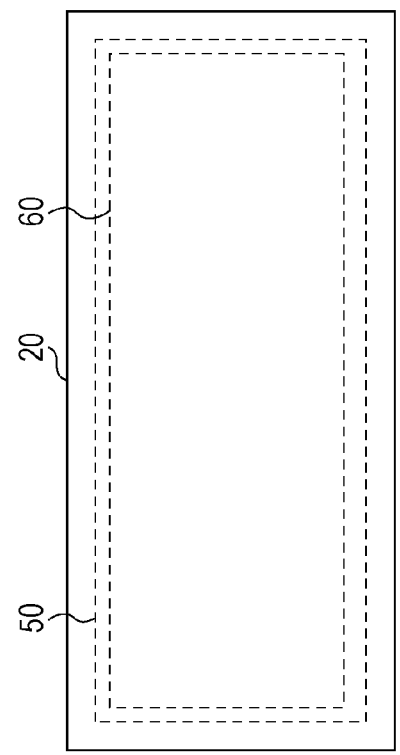
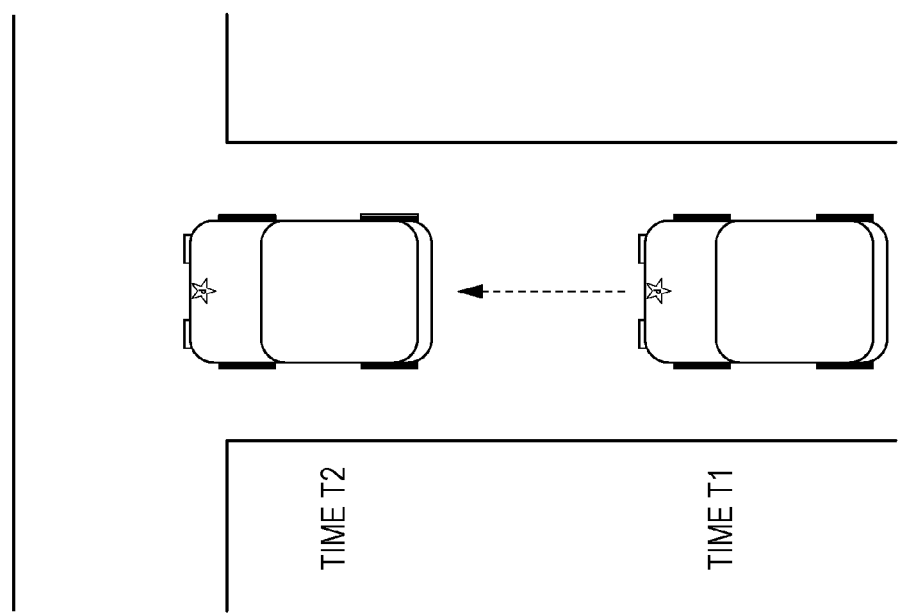

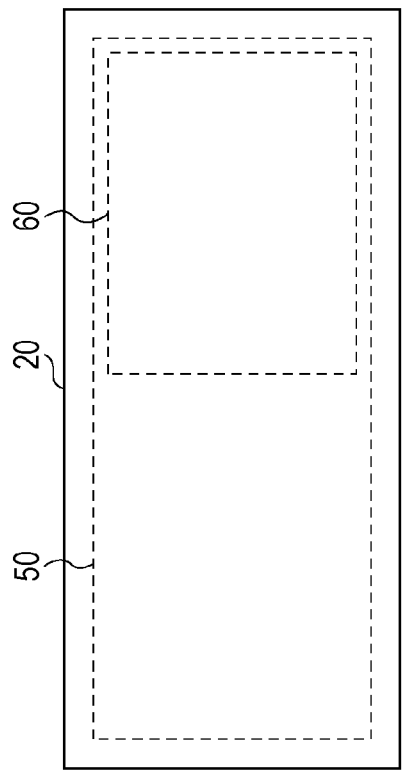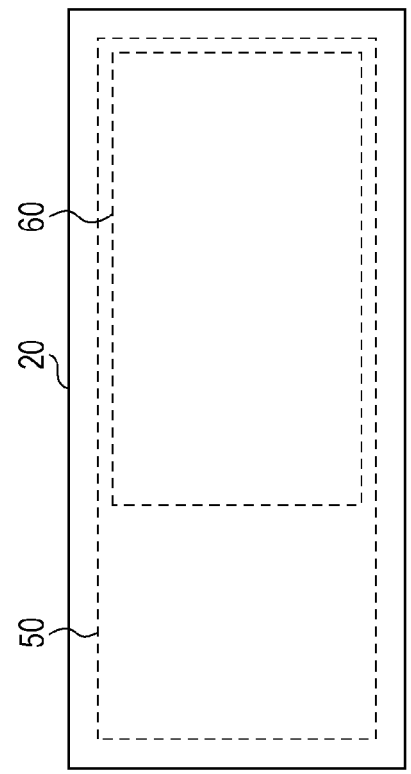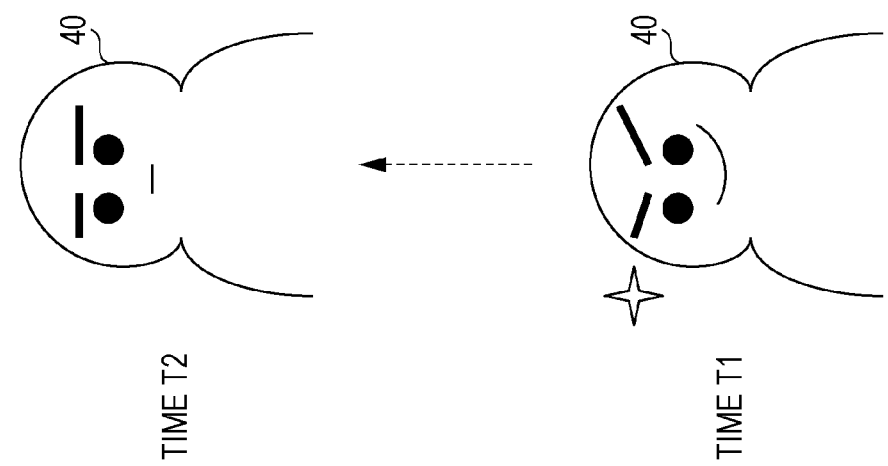

FIG. 9

| VEHICLE INFORMATION | RESTRICTED AREA | |
|---|---|---|
| | LOCATION | SIZE |
| AUTOMATIC DRIVING MODE | — | ZERO |
| MANUAL DRIVING MODE | — | ONE-HALF OF THE WHOLE SCREEN AREA |
| ROAD: STRAIGHT | — | ONE-HALF OF THE WHOLE SCREEN AREA |
| ROAD: T JUNCTION | — | TWO-THIRDS OF THE WHOLE SCREEN AREA |
| AROUSAL LEVEL OF DRIVER: HIGH | — | ONE-HALF OF THE WHOLE SCREEN AREA |
| AROUSAL LEVEL OF DRIVER: MIDDLE | — | ONE-HALF OF THE WHOLE SCREEN AREA |
| AROUSAL LEVEL OF DRIVER: LOW | — | TWO-THIRDS OF THE WHOLE SCREEN AREA |
| DRIVING STRAIGHT | IN FRONT OF DRIVER $(X_1, Y_1)$ | — |
| DRIVING ON CURVE TO RIGHT | ON RIGHT-HAND SIDE $(X_R, Y_R)$ | — |
| DRIVING ON CURVE TO LEFT | ON LEFT-HAND SIDE $(X_L, Y_L)$ | — |
| TRAFFIC SIGNAL: RED | IN UPPER AREA $(X_U, Y_U)$ | ONE-SIXTH OF THE WHOLE SCREEN AREA |
| TRAFFIC SIGNAL: BLUE | IN FRONT OF DRIVER $(X_2, Y_2)$ | ONE-HALF OF THE WHOLE SCREEN AREA |
| TURNING TO LEFT/RIGHT (OPERATING BLINKER) | — | TWO-THIRDS OF THE WHOLE SCREEN AREA |

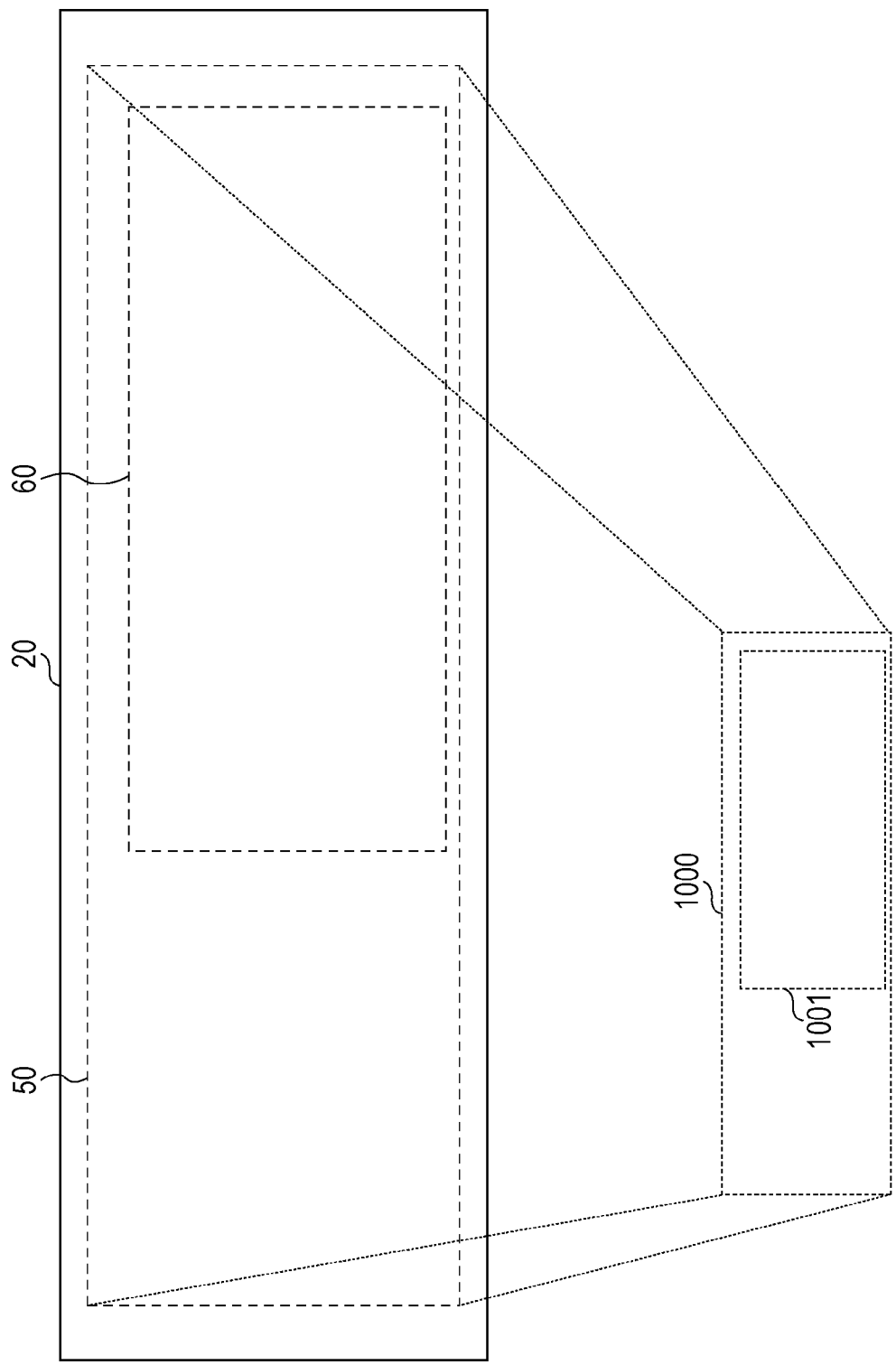

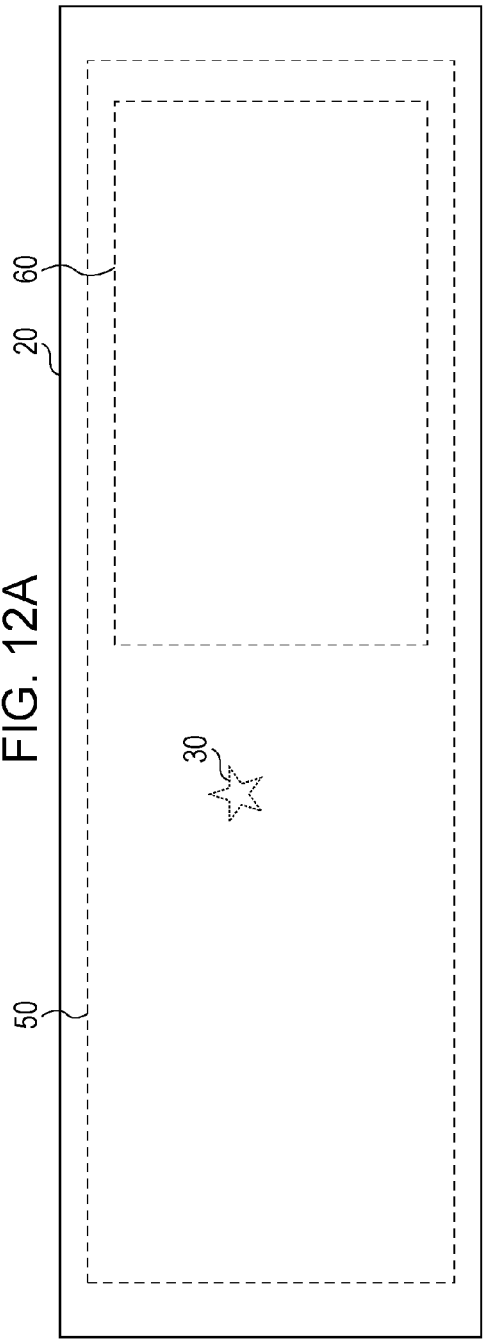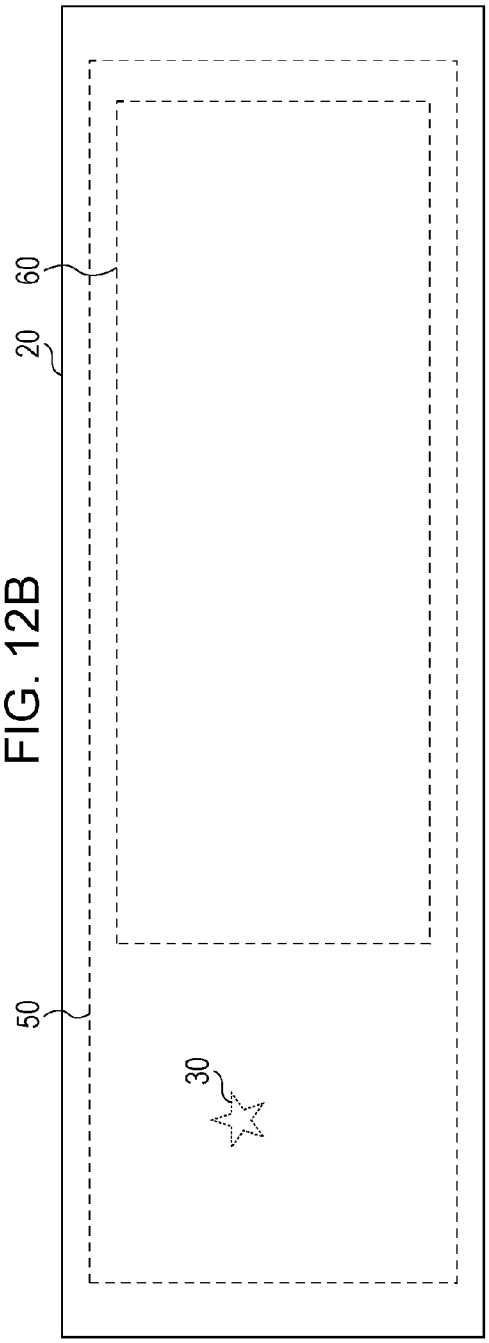

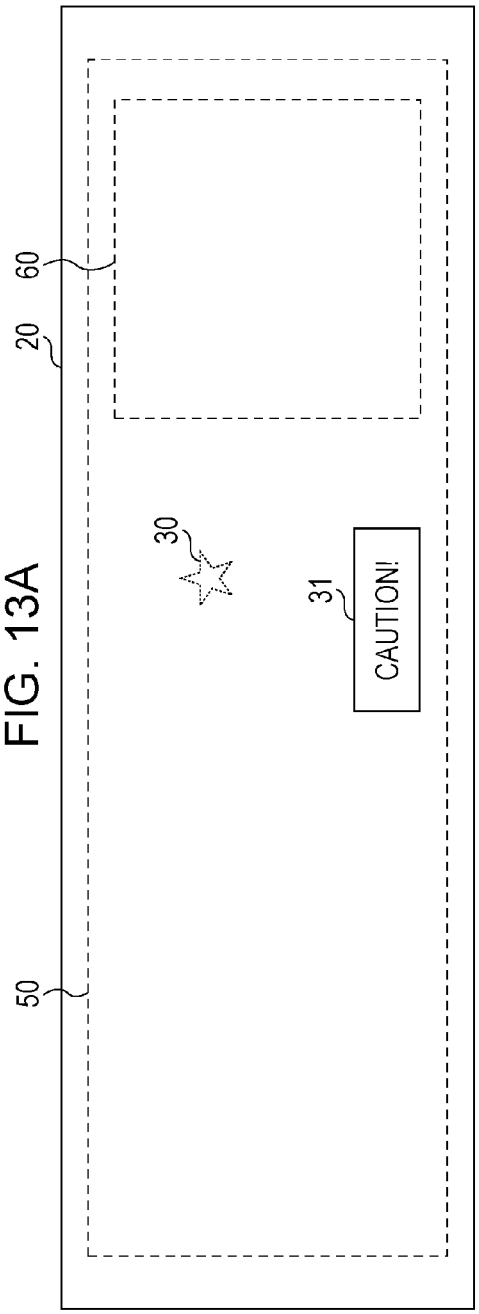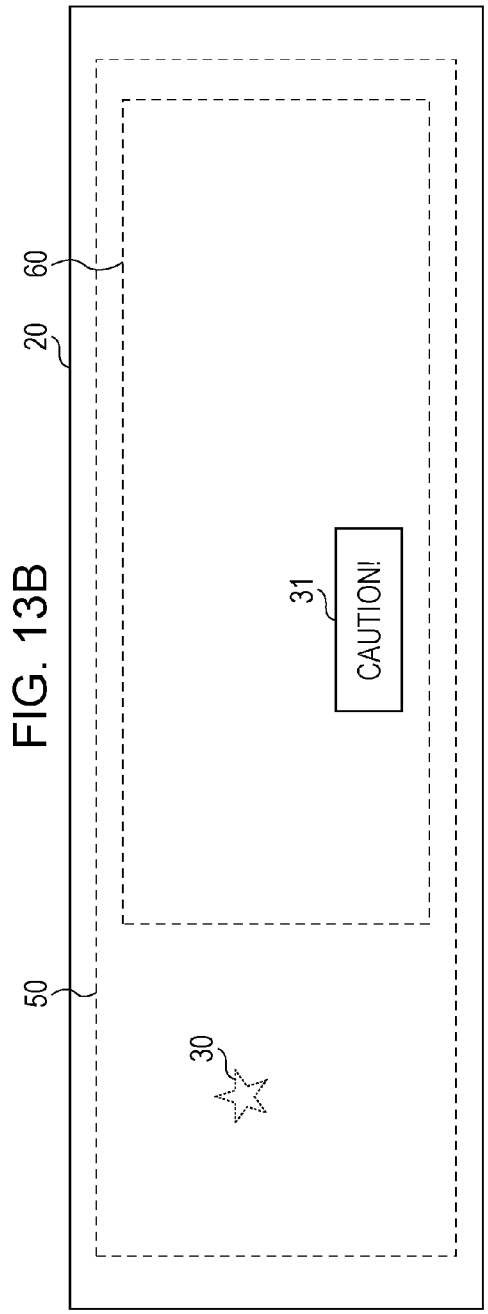

DISPLAY CONTROL APPARATUS, COMPUTER-IMPLEMENTED METHOD, STORAGE MEDIUM, AND PROJECTION APPARATUS

BACKGROUND OF THE INVENTION

1. Field of the Invention

The present disclosure is related to a display control apparatus configured to control displaying of information provided to a driver or the like of a vehicle or the like, a method of controlling the displaying, a program of controlling the displaying, and a projection apparatus.

2. Description of the Related Art

In recent years, there has been an intensive effort to develop a head-up display apparatus configured to project a display image onto a front windshield so as to allow a user to view a virtual image. Herein, the user is supposed to be a driver of a vehicle or the like. There has also been an intensive effort to develop a head mounted display apparatus configured to project a display image onto a glasses-type wearable terminal so as to allow a user to view a virtual image. These techniques are all based on a similar principle.

A method of controlling a display position of a display image projected onto a front windshield is disclosed, for example, in Japanese Unexamined Patent Application Publication No. 2011-2660 (hereinafter, referred to as a conventional technique).

In the conventional technique, a front windshield is divided into a display allowed area in which a display image is allowed to be displayed and a display prohibited area in which a display image is not allowed to be displayed, where the display allowed area is located in a peripheral area of the front windshield and the display prohibited area is located in the center of the front windshield. In the conventional technique, when the display image is moved to another location on the front windshield according to an intention of a driver, if the destination location to which the display image is specified to be moved is in the display prohibited area, the location of the display image is changed from the specified location to a location, closest to the specified location, in the display allowed area.

SUMMARY OF THE INVENTION

In the conventional technique, to prevent the driver's front view from being blocks, it is necessary to set the display prohibited area to occupy a large area, which makes it difficult to ensure that the display allowed area has a large area sufficient in any situation.

Thus, a non-limiting exemplary embodiment of the present disclosure provides a display control apparatus capable of, depending on the situation, preventing the user's front view from being blocked while keeping an area in which information is displayed, a display control method, a display control program, and a projection apparatus.

According to a non-limiting exemplary embodiment of the present disclosure, there is provided a display control apparatus configured to control image data displayed on a predetermined display medium, including an information acquisition unit configured to acquire a first information associated with the predetermined matter at a first time and acquire a second information associated with the predetermined matter at a second time after the first time, a determination unit configured to judge whether there is a predetermined change between the first information associated with the predetermined matter and the second information associated with the predetermined matter, and a control unit configured to control image data such that in a case where a predetermined change is detected, a first restricted area, which is an area of the display in which projecting of display information included in the image data is limited, is changed from a first restricted area related to the first information associated with the predetermined matter to a second restricted area related to the second information associated with the predetermined matter. General or specific embodiments of the present disclosure may be implemented in a system, a method, an integrated circuit, a computer program, or a storage medium, or an arbitrary combination thereof.

The display control apparatus according to the embodiment of the present disclosure is capable of, depending on the situation, preventing the user's front view from being blocked while keeping an area in which information is displayed.

BRIEF DESCRIPTION OF THE DRAWINGS

FIG. 1 is a conceptual diagram illustrating an example of a system according to an embodiment of the present disclosure.

FIG. 2 is a block diagram illustrating an example of a configuration of a projection apparatus according to an embodiment of the present disclosure.

FIG. 3 is a conceptual diagram illustrating an example of a restricted area according to an embodiment of the present disclosure.

FIGS. 4A to 4C are diagrams illustrating a first example of a change judged by a display control apparatus according to an embodiment of the present disclosure.

FIGS. 5A to 5C are diagrams illustrating a second example of a change judged by a display control apparatus according to an embodiment of the present disclosure.

FIGS. 8A to 8C are diagrams illustrating a fifth example of a change judged by a display control apparatus according to an embodiment of the present disclosure.

FIG. 9 illustrates an example of a table used in performing a judgment by a display control apparatus according to an embodiment of the present disclosure.

FIG. 10 is a conceptual diagram illustrating an example of a correspondence between a restricted area in image data and a restricted area on a display.

FIGS. 12A and 12B are conceptual diagrams illustrating a first modified example associated with a display control apparatus according to an embodiment of the present disclosure.

FIGS. 13A and 13B are conceptual diagrams illustrating a fifth modified example associated with a display control apparatus according to an embodiment of the present disclosure.

DESCRIPTION OF THE PREFERRED EMBODIMENTS

Figure 6B:
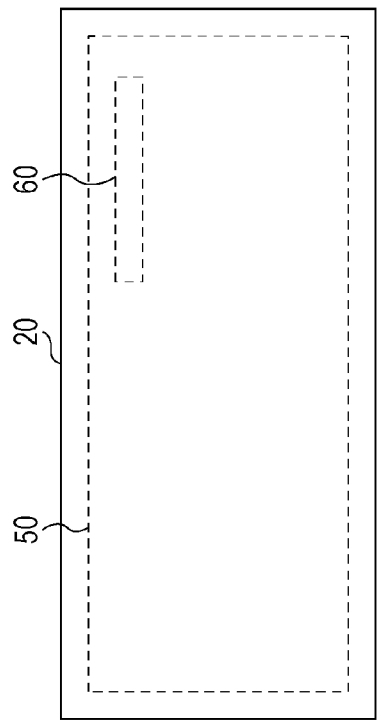
FIGS. 6A to 6C are diagrams illustrating a third example of a change judged by a display control apparatus according to an embodiment of the present disclosure.

The present disclosure is described in detail below with reference to embodiments in conjunction with drawings.

First Embodiment

A first embodiment according to the present disclosure is described below.

FIG. 1 is a conceptual diagram illustrating a system 1 according to the first embodiment. In FIG. 1, the system 1 includes a projection apparatus 10 and a display 20.

The projection apparatus 10 has a projector function and the like and is configured to project internally-generated image data on to the display 20. The display 20 is also referred to as a display medium.

Examples of apparatuses usable as the display medium 20 include a head-up display (HUD), a head-mounted display or helmet-mounted display (HMD), and a glasses-type display medium (smart glasses). The display medium may be, for example, a windshield of a vehicle, or a glass surface or a plastic surface provided separately from the windshield. The windshield may be, for example, a front windshield, side glass, or a rear glass of a vehicle.

The type of the display may be any one of the following: a virtual image projection type, a retinal projection type, an optically transparent type (optically see-through type); a transparent video type (video see-through type); and a non-transparent type. The display image displayed may be a virtual image or a real image. As for the optically transparent type display, an application to an in-vehicle HUD has been in research and development (see, for example, Hye Sun Park, Min Woo Park, Kwang Hee Won, Kyong-Ho Kim, and Soon Ki Jung, "In-Vehicle AR-HUD System to Provide Driving-Safety Information", ETRI Journal, Volume 35, Number 6, December 2013). For example, the optically transparent type display may be attached to the inner surface of a windshield of a vehicle, or may be embedded in a windshield during a process of forming the windshield of the vehicle.

In the following description, it is assumed by way of example that the display is a virtual image projection type HUD, although many other types of displays may also be employed. In a case where an optically transparent type display is used instead of the virtual image projection type HUD, display information is displayed not as a virtual image but as a real image on the display.

Although in the following explanation of the present embodiment, a HUD is taken as an example, the present embodiment is also application to other types of display media such as a HMD, a glasses-type display medium, or the like. In the case of the HUD, a user is a driver, a pilot, or crew of a moving object such as a vehicle, a ship, an airplane, or the like. In the case of the HMD or the glasses-type display medium, the user is not limited to the driver, the pilot, or the crew, but a passenger wearing the HMD or the glasses-type display medium may also be a user. Note that hereinafter the term "driver" is used to generically describe the user.

In a case where the display is an optically transparent type (optical see-through type) or the like, the display unit 200 displays image data on the display. In the following description, it is assumed, for simplicity, that the image data is displayed on the display regardless of whether the display is of the optically transparent type or the virtual image projection type.

As illustrated in FIG. 1, image data 50 projected or displayed by the projection apparatus 10 includes display information 30 presented to a driver 40 (example of a user) of a vehicle. The image data (also referred to simply as an image) 50 refers to image data formed on the display medium 20 by projecting the image data (predetermined image data) generated inside the projection apparatus 10. The display information 30 is an image that is projected as a part of the image data 50 onto the display medium 20 and that represents a content of notification information presented to the driver 40. The projected display information 30 is viewed as a virtual image by the driver 40. The principle of how the display information 30 projected on the display medium 20 is viewed by the driver 40 is known, and thus a further description thereof is omitted. In the present embodiment, it is assumed by way of example that the display information 30 is a graphical image of an augmented reality (AR). Note that the display information 30 may be a character, a symbol, or a combination of a character, a symbol, and a graphical image.

The projection apparatus 10 may be configured so as to include the display medium 20.

FIG. 2 is a block diagram illustrating an example of a configuration of the projection apparatus 10 including the display control apparatus 100 according to the present embodiment. In FIG. 2, the projection apparatus 10 includes the display control apparatus 100 and the display unit 200.

The display control apparatus 100 controls the image data projected by the display unit 200. Although in the following description, it is assumed by way of example that the image data is generated by the display unit 200, the image data may be generated by the display control apparatus 100 or not-illustrated another constituent element. Note that units 110 to 130 in the display control apparatus 100 are described later.

The display unit 200 displays image data on the display medium 20. In a case where the display unit 200 is the HUD, the display unit 200 has a function of a projector and the display unit 200 directly projects the image data 50 onto the display medium 20. Alternatively, the display unit 200 may not have the function of the projector and, instead, the display medium 20 may have a display function, and the display unit 200 may display the image data on the display medium 20. Alternatively, the display unit 200 may project the image data using a hologram such that an image is formed in the space. In a case where the hologram is used, a light guide plate may be used that is configured to guide light such that parallel light beams satisfying the internal total reflection condition of the light guide plate are subjected to the internal total reflection, and part of the guided parallel light beams is emitted from the light guide plate to provide a virtual image to the driver.

Although in the system using the light guide plate, image data is not directly projected like the projector, the terms "project" or "projection" is used for convenience of explanation.

FIG. 3 illustrates an example of a restricted area 60 of the image data 50 projected onto or displayed on the display medium 20. For example, in a case where there is an object (for example, a pedestrian walking across a road, or the like) in a front view seen via the front windshield and a driver should pay attention to the object, if the display information 30 is superimposed on the object, the display information 30 may make it difficult for the driver to see the object. To handle such a situation, the restricted area 60 is defined on the display medium 20. The restricted area 60 is an area defined on the display medium in which projecting of the display information 30 included in the image data 50 is restricted. In the present embodiment, the display control apparatus 100 changes the configuration parameters of the restricted area 60 depending on a traffic environment, a state of the vehicle, and a state of the driver 40. More specifically, the configuration parameters of the restricted area 60 are at least one of a location, a size, a shape, and the like of the restricted area 60. This allows an increase in the degree of freedom of the location where the display information is projected, which provides improved convenience to the driver in using the display medium (for example, the HUD, the HMD or the like).

Next, referring to FIG. 2 and FIG. 3, a configuration of the display control apparatus 100 is described below.

Figure 15:
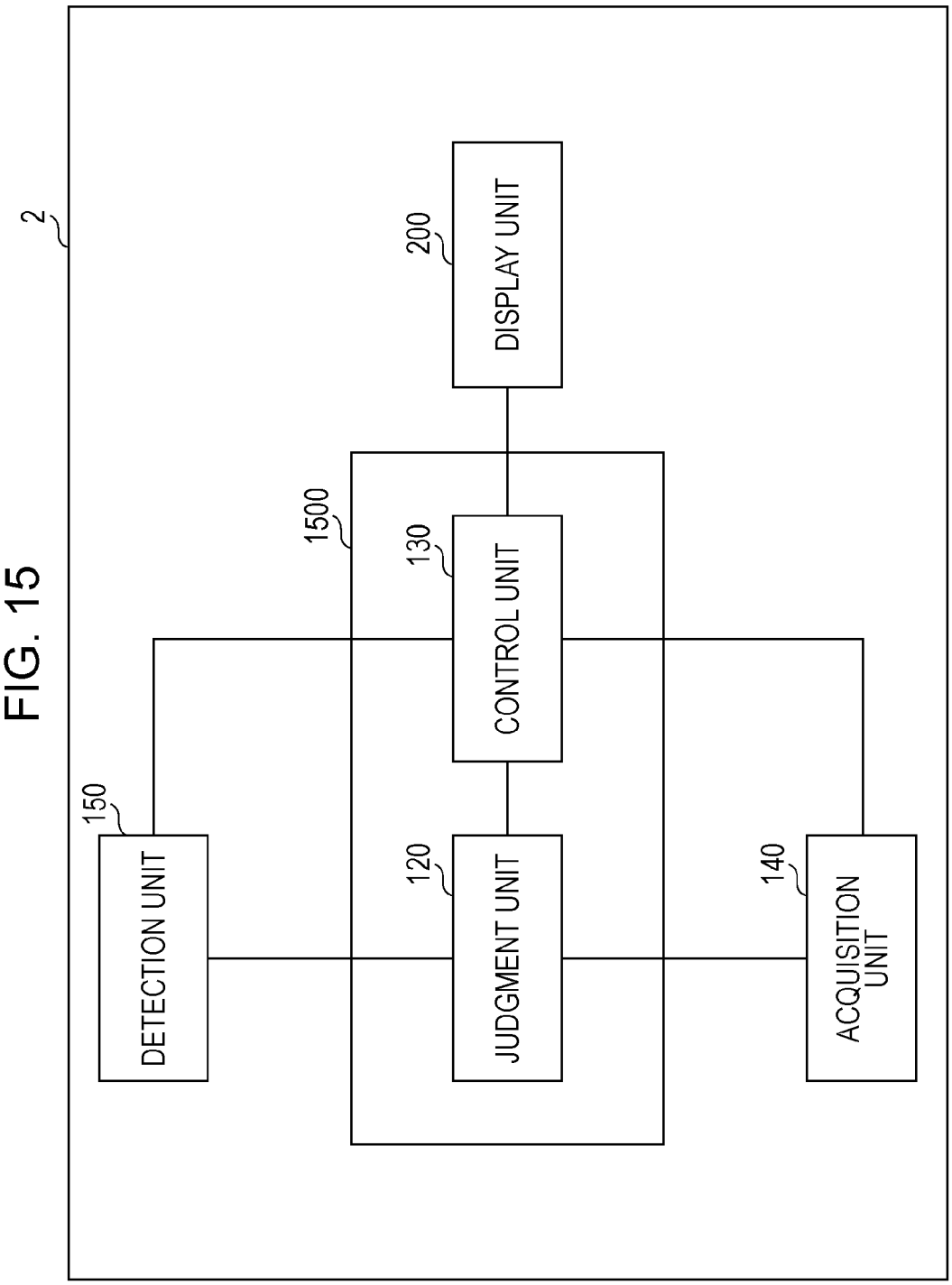
FIG. 15 is a block diagram illustrating an example of a system according to an embodiment of the present disclosure.

As illustrated in FIG. 2, the display control apparatus 100 includes an information acquisition unit 110, a judgment unit 120, and a control unit 130. Note that the configuration of the display control apparatus 100 illustrated in FIG. 2 is merely an example, and the display control apparatus 100 may alternatively be configured, for example, as illustrated in FIG. 15. The configuration illustrated in FIG. 2 and the configuration illustrated in FIG. 15 both include the judgment unit 120 and control unit 130 and both are similar in operations and effects.

First, an overview of the respective units 110 to 130 is described. The information acquisition unit 110 acquires first information associated with the predetermined matter at a first time, and acquires second information associated with the predetermined matter at a second time later than the first time. The judgment unit 120 judges whether there is a predetermined change between the first information associated with the predetermined matter and the second information associated with the predetermined matter. In a case where a predetermined change is detected, the control unit 130 controls the image data such that the restricted area, which is an area on the display medium 20 in which projecting or displaying of display information included in the image data 50 is limited, is changed from a restricted area defined in relation to the first information associated with the predetermined matter to the restricted area defined in relation to the second information associated with the predetermined matter.

Next, the respective units 110 to 130 are described in further detail below.

Information Acquisition Unit 110

The information acquisition unit 110 acquires information on a particular matter. For example, the information on the particular matter is vehicle information including at least one of internal vehicle information and external vehicle information. The information acquisition unit 110 acquires vehicle information from, for example, a non-illustrated sensing camera, a driver monitoring camera, a peripheral device such as various kinds of sensors or the like, or via an in-vehicle local area network (LAN) such as a controller area network (CAN), a local interconnect network (LIN), or the like. Alternatively, the information acquisition unit 110 may acquire the vehicle information, for example, from a cloud server, or via a portable terminal such as a smartphone or the like carried in the vehicle, or via sound/voice information input by the driver, or from an information terminal installed on a traffic road or an in-vehicle terminal such as a car navigation apparatus or the like. The information acquisition unit 110 transmits and receives information to or from peripheral devices or the like via wired or wireless communication. Note that the information acquisition unit 110 is similar in function to the detection unit 150 in FIG. 15. Details of the vehicle information will be described later.

The timing for the information acquisition unit 110 to acquire the vehicle information may be controlled according to timing control data/signal actively acquired at predetermined time intervals from a peripheral device or via an in-vehicle LAN or passively received from the peripheral device or via the in-vehicle LAN each time the peripheral device or the in-vehicle LAN generates vehicle information. The information acquisition unit 110 acquires first information associated with the predetermined matter at a first time and acquires second information associated with the predetermined matter at a second time later than the first time.

For example, in a case where the information acquisition unit 110 actively acquires the vehicle information at the predetermined time intervals, the second time is a time at which the vehicle information is acquired after the first time. For example, in a case where the information acquisition unit 110 passively acquires the vehicle information from the peripheral device or the like, the second time is a time at which the vehicle information is transmitted from the peripheral device or the like after the first time. Note that from the point of view of the real-time operation of the apparatus, it is desirable that of a plurality of possible times after the first time, a time immediately after the first time is selected as the second time, although the second time is not limited to such a time but the second time may be selected according to the specifications of the apparatus.

The vehicle information is described in further detail below.

The internal vehicle information is information representing a state of a driver, information representing a state of a vehicle, or the like. More specifically, for example, the internal vehicle information represents an arousal level of the driver a driving mode (an automatic driving mode or a manual driving mode), an on/off state of a blinker, a vehicle speed, a measurement value output by a gyroscope, and/or the like. The arousal level of the driver is estimated by performing an image analysis on an image provided by a camera configured to capture an image of at least one of a face and a position of the driver. The automatic driving mode may be classified into levels from a first level to a fourth level or the like according to a degree to which the driver is released from the driving operation. More specifically, for example, the automatic driving mode may be classified into levels from a level-0 (no-automation) to a level-4 (full self-driving automation) according to a degree to which an automatic driving system is involved.

On the other hand, external vehicle information is information representing a traffic environment or the like. More specifically, for example, the external vehicle information is information representing a road shape (straight or curved shape), a road slope, weather, a traffic signal state, or the like.

In the present embodiment, the vehicle information includes one or more elements. For example, in a case where the vehicle information represents the "automatic driving mode", this vehicle information includes one element "automatic driving mode". For example, in a case where the vehicle information represents "manual driving mode, left curve, driver's arousal level: high", the vehicle information includes three elements, "manual driving mode", "left curve", and "driver's arousal level: high". The number of elements included in the vehicle information may be set according to the specifications of the apparatus. The elements included in the vehicle information are used by the judgment unit 120 to in making a judgment as described later. Note that the term "element" is used for convenience of explanation, and note that elements are vehicle information.

The vehicle information acquired by the information acquisition unit 110 is output to the judgment unit 120.

Judgment Unit 120

The judgment unit 120 judges whether there is a predetermined change between the first information associated with the predetermined matter (for example, vehicle information) acquired at a first time by the information acquisition unit 110 and the second information associated with the predetermined matter (for example, vehicle information) acquired at a second time later than the first time.

The judgment on whether there is the predetermined change is performed for each of elements included in the vehicle information. In a case where the vehicle information includes only one element, the judgment is made only in terms of this one element. In this case, the concept of "element" may be meaningless. Among one or more elements included in the vehicle information, if the predetermined change is found for any one of elements, the judgment unit 120 judges that the predetermined change has occurred between the first vehicle information and the second vehicle information.

The predetermined change is a specific change in the traffic environment, a specific change in the vehicle state, or a specific change in the driver's state or a combination thereof. In other words, the predetermined change is a change in the traffic environment, the vehicle state, or the driver's state or a combination thereof, which makes it necessary to change the configuration parameters (at least one of the location, the size, and the shape) of the restricted area 60.

Examples of predetermined changes include a change in vehicle running state between running straight and running along a curve, a change in driving mode between a manual driving mode and an automatic driving mode, a change in automatic driving mode between different levels, a change in traffic signal state, a change in driver's arousal level, a change in road slope, a change in road shape, a change in weather, and the like. Examples of changes in road shape are a change in road shape between an upslope and a downslope, a change in road shape between a straight road and a T-junction, and the like. Note that the examples described above are merely some of many examples, and other changes may be defined and added to the apparatus. The adding may be realized by updating a program.

The predetermined change may be determined based on specifications of the apparatus. For example, in a case where a change in vehicle information occurs from first vehicle information "manual driving mode, running along curve" to second vehicle information "automatic driving mode (level 4: full automatic driving), running along curve", a change occurs in driving mode and thus the judgment unit 120 may judge that there is the predetermined change. In a case where the vehicle information includes an element "automatic driving mode", even when a change occurs in another element (for example, in "running along curve"), the judgment may be performed such that there is no predetermined change. The judgment may be made according to the design specifications, the embodiment is not limited to the examples described above.

For example, in a case where the vehicle information includes an element "driver's arousal level", the predetermined change associated with driver's arousal level is determined according to the specifications of the apparatus. For example, in a case where the degree of arousal are classified into five levels, extremely low, low, middle, high, and extremely high, when a change occurs from "arousal level: middle" to a "arousal level: low", the judgment may be such that there is the predetermined change, while when a change occurs from "arousal level: middle" to a "arousal level: high", the judgment may be such that there is no predetermined change.

The predetermined change judged by the judgment unit 120 is described in further detail below with reference to examples.

First Example of Predetermined Change

In this example, the predetermined change is defined as a change from first vehicle information "running straight" to second vehicle information "running along left curve". FIG. 4A is a diagram illustrating a vehicle running on a road as seen from right above. FIG. 4B and FIG. 4C are diagrams illustrating a restricted area 60 of a display medium 20. Referring FIGS. 4A to 4C, the first example of the predetermined change is described below.

In the example illustrated in FIG. 4A, a vehicle is running straight at a time T1 (example of the first time) while the vehicle is running along a left curve at time T2 (example of the second time) after time T1. In this case, the information acquisition unit 110 acquires, at time T1, first vehicle information "running straight" indicating that the vehicle is running straight, and acquires, at time T2, second vehicle information "running along left curve" indicating that the vehicle is running along a left curve. The judgment unit 120 compares these two pieces of vehicle information and regards the change from "running straight" to "running along left curve" as satisfying the predetermined change and thus judges that there is the predetermined change.

As described above, the change from a state in which a vehicle is running straight to a state in which the vehicle is running along a curve is regarded as the predetermined change because this change results in a change in range in which the driver should a visual confirmation. That is, in the situation in which the vehicle is running straight, the driver should attentively look straight ahead for the visual confirmation, and thus it is desirable that the restricted area 60 is located in front of a driver's seat as illustrated in FIG. 4B (right-hand steering wheel is assumed). On the other hand, in the situation in which the vehicle is running along a left curve, the driver should attentively look ahead of the curve, and thus it is desirable that the restricted area 60 is located on a diagonally left side ahead of the driver's seat as illustrated in FIG. 4C. Thus, in the case where the judgment unit 120 judges that a change occurs in vehicle information from "running straight" to "running along left curve", the control unit 130 (described later) controls the image data 50 such that the location of the restricted area 60 is changed from that illustrated in FIG. 4B to that illustrated in FIG. 4C. This makes it possible to prevent the driver's front view from blocked by display information displayed in the area that blocks the front view, while keeping the area in which it is allowed to display the display information.

Although in the present example it is assumed that the steering wheel is located on the right side, the embodiment is applicable to the case where the steering wheel is located on the left side. In the case of the left-side steering wheel, it is judged that the predetermined change occurs when a change is detected from a running straight state to a running along right curve state. This also holds in the following description.

The vehicle information indicating the vehicle running state (running straight or running along curve) may be generated based on steering information supplied via the in-vehicle LAN, map information, a sensor such as a gyroscope sensor or other sensors, image information generated by a camera configured to capture an image of an outside of the vehicle, position information such as GPS information, and/or the like. The vehicle information representing the vehicle running state may be judged or generated as required by a non-illustrated another constituent element. The judgment unit 120 may judge whether the vehicle is approaching a curve based on the image information or the navigation information, and may judge whether a predetermined change is predicted to occur.

Second Example of the Predetermined Change

In this example described below, it is assumed that the predetermined change is defined as a change from first vehicle information "road: running straight" to second vehicle information "road: T-junction". FIG. 5A is a diagram illustrating a vehicle rutting on a road as seen from right above. FIG. 5B and FIG. 5C are diagrams illustrating a restricted area 60 of the display medium 20. Referring FIGS. 5A to 5C, the second example of the predetermined change is described below.

In the example illustrated in FIG. 5A, a vehicle is running on a straight road at time T1 (example of first time) the vehicle is going to make a right or left turn at a T-junction at (example of second time) after time T1. In this case, the information acquisition unit 110 acquires, at time T1, first vehicle information "road: running straight" indicating that the vehicle is running on a straight road, and acquires, at time T2, second vehicle information "road: T-junction" indicating that the vehicle is going to make a right or left turn at a T-junction. The judgment unit 120 compares these two pieces of vehicle information and judges that the predetermined change occurs based on the fact that the change occurs from "road: running straight" to "road: T-junction".

As described above, the change from a state in which a vehicle is running on a straight road to a state in which the vehicle is going to make a right or left turn at a T-junction is regarded as the predetermined change because this change results in a change in range that is supposed to be attentively looked at for the visual confirmation by the driver. That is, in the situation in which the vehicle is running on a straight road, the driver attentively looks straight ahead and recognizes the side state by looking aside, and thus it is desirable that the restricted area 60 is located in front of the driver's seat as illustrated in FIG. 5B (in the case where the steering wheel is located on the right side). On the other hand, in the situation in which the vehicle is going to make a right or left turn at a T-junction, the driver should pay attention to a traffic environment while attentively looking to the left and right alternately. Therefore, it is desirable that the restricted area 60 is set such that its horizontal width is substantially equal to the horizontal width of the display medium 20 as illustrated in FIG. 5C. Thus, in the case where the judgment unit 120 judges that a change occurs in vehicle information from "road: running straight" to "road: T-junction", the control unit 130 (described later) controls the image data 50 such that the location of the restricted area 60 is changed from that illustrated in FIG. 5B to that illustrated in FIG. 5C. This makes it possible, in the situation in which a right or left turn is going to be made, to prevent the front view from being blocked by display information displayed in a viewing direction, while ensuring that the display medium 20 has an area in which it is allowed to display information.

The vehicle information representing the traffic environment in which the vehicle is running may be generated based on steering information supplied via the in-vehicle LAN, map information, a sensor such as a gyroscope sensor or other sensors, image information generated by a camera configured to capture an image of the outside of the vehicle, or position information such as GPS information, and/or the like. The vehicle information representing the vehicle running state may be judged or generated as required by a non-illustrated another constituent element. For example, the judgment unit 120 may recognize a stop sign, a stop line, or the like from the image information and may make a judgment on the occurrence of the predetermined change based on a recognition result. In this case, the predetermined change may be defined as a change from a state in which "no sign is detected" to a state in which "a sign is detected".

In the present example, it is assumed that the predetermined change occurs when a right or left turn is going to be made at a T-junction. Alternatively, for example, based on a blinker operation (left turn/right turn) performed by the driver, it may be allowed to detect a state in which the vehicle is going to make a right or left turn, and the judgment on the predetermined change may be made according to the detected state. In this case, the predetermined change may be defined as a change in state from "there is no blinker operation" to "there is a blinker operation". This makes it possible to detect the predetermined change when a right or left is going to be made even at a place other than a T-junction, and it is allowed to change the restricted area 60 in response to detecting the predetermined change. Still alternatively, based on route information of car navigation information, it may be allowed to detect a state in which the vehicle is approaching a T-junction or an intersection, and a judgment may be made as to whether a predetermined change is going to occur.

Third Example of the Predetermined Change

Figure 6C:
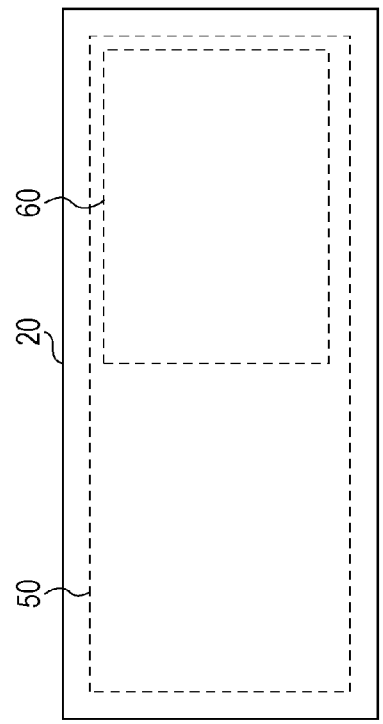
Figure 6A:
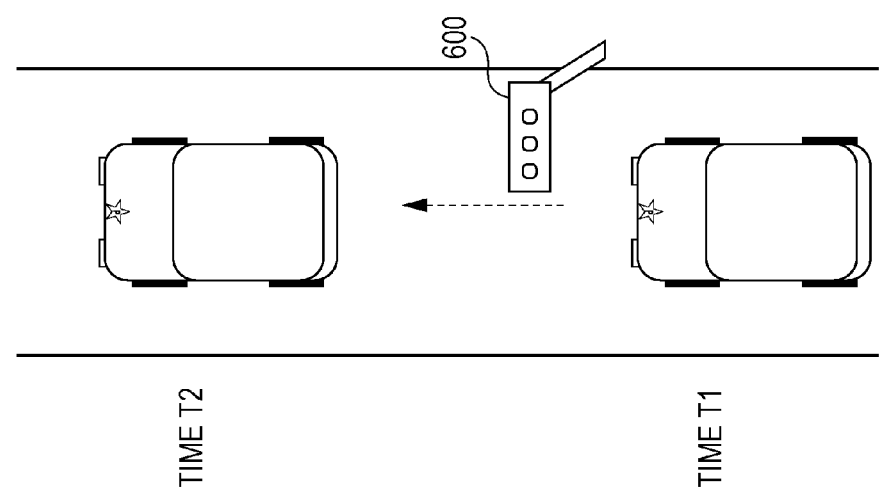

In this example described below, the predetermined change is defined as a change from first vehicle information "signal: red" to second vehicle information "signal: blue". FIG. 6A is a diagram illustrating a vehicle rutting on a road as seen from right above. FIG. 6B and FIG. 6C are diagrams illustrating a restricted area 60 of a display medium 20. Referring FIGS. 6A to 6C, the third example of the predetermined change is described below.

In the example illustrated in FIG. 6A, a vehicle is in a stop state at a red signal of a traffic signal 600 at time T1 (example of first time) and the vehicle starts to run in response to a change in the state of the traffic signal 600 from red to blue at time T2 (example of second time) after time T1. In this case, the information acquisition unit 110 acquires, at time T1, first vehicle information "signal: red" indicating that the traffic signal 600 is in the red state, and acquires, at time T2, second vehicle information "signal: blue" indicating that the traffic signal 600 is in the blue state. The judgment unit 120 compares these two pieces of vehicle information and detects the change in vehicle information from "signal: red" to "signal: blue", and thus the judgment unit 120 judges that the predetermined change has occurred.

As described above, the change from the red signal to the blue signal is regarded as the predetermined change, because this change in the state results in a change in the range that should be attentively looked at by the driver. That is, when the traffic signal 600 is in the red state, the driver is released from driving the vehicle, and thus the restricted area 60 is allowed to be located in a small area directly ahead of the driver's seat as illustrated in FIG. 6B. On the other hand, when the traffic signal 600 changes from the red state to the blue state, the driver needs to start driving the vehicle, and thus it is desirable that the restricted area 60 is located in a large area directly ahead of the driver's seat as illustrated in FIG. 6C. Thus, in the case where the judgment unit 120 judges that a change occurs in vehicle information from "signal: red" to "signal: blue", the control unit 130 (described later) controls the image data 50 such that the location of the restricted area 60 is changed from that illustrated in FIG. 6B to that illustrated in FIG. 6C. Thus, in the situation in which the vehicle starts running in response to a change in the traffic signal state to blue, it is possible to prevent a front view from being blocked by display information displayed in a viewing direction while ensuring that the display medium 20 has an area in which it is allowed to display information.

The vehicle information representing the change in the state of the traffic signal 600 may be generated based on image information generated by a camera configured to capture an image of the outside of the vehicle, information transmitted from an information terminal installed at an intersection, information transmitted from a cloud server, or the like. The vehicle information representing the change in the state of the traffic signal 600 may be judged or generated as required by a non-illustrated another constituent element.

In the example described above, the explanation is given by way of example for a case in which a change occurs in the state of the traffic signal 600. Alternatively, the restricted area 60 may be controlled in response to a change in the state of a signal for pedestrians. In this case, the change in the state of the signal for pedestrians from blue to red is regarded as the predetermined change. In response to the predetermined change, the area of the restricted area 60 is changed from that illustrated in FIG. 6B to that illustrated in FIG. 6C.

Fourth Example of the Predetermined Change

Figure 7B:
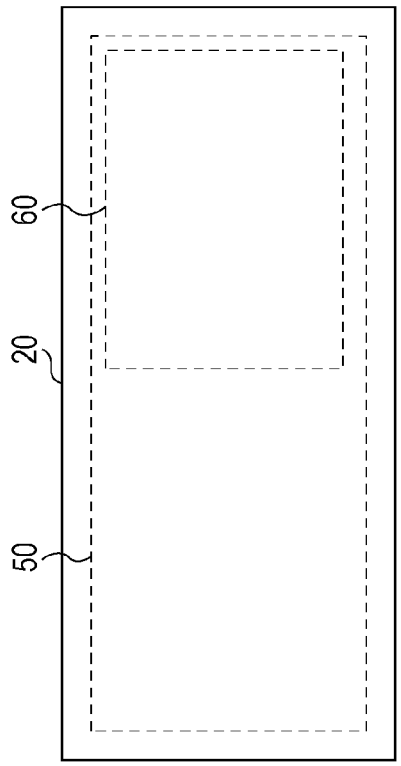
FIGS. 7A to 7C are diagrams illustrating a fourth example of a change judged by a display control apparatus according to an embodiment of the present disclosure.
Figure 7C:
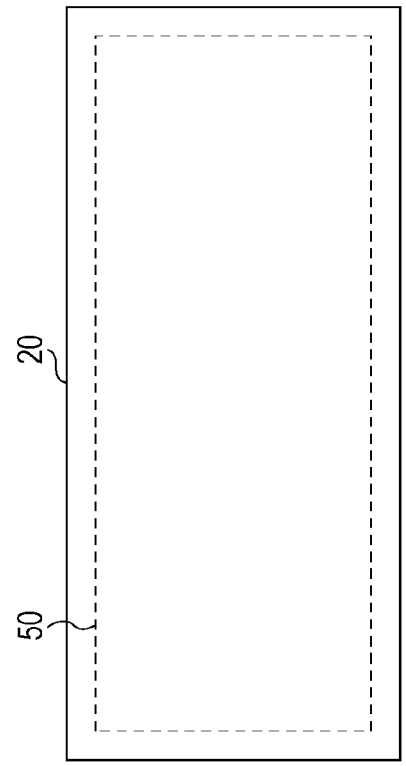
Figure 7A:
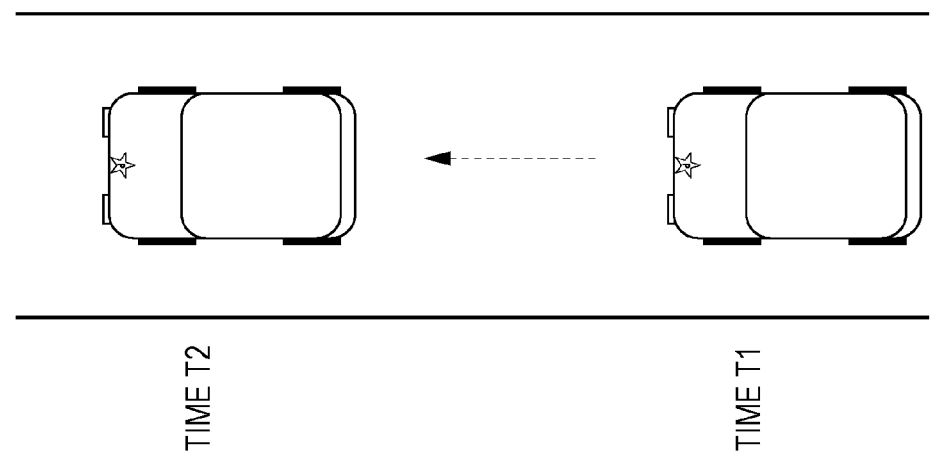

In this example described below, the predetermined change is defined as a change from first vehicle information "manual driving mode" to second vehicle information "automatic driving mode". FIG. 7A is a diagram illustrating a vehicle rutting on a road as seen from right above. FIG. 7B and FIG. 7C are diagrams illustrating a restricted area 60 of the display medium 20. Referring FIGS. 7A to 7C, the fourth example of the predetermined change is described below.

The automatic driving mode is classified into five automatic driving levels according to a degree to which the automatic driving system is involved with the driving, and more specifically, the automatic driving level is classified into levels from level 0 (no-automation) to level 4 (full self-driving automation). In the present example, the explanation is given by way of example for a case where the automatic driving mode is in level 4 (full self-driving automation).

In the example illustrated in FIG. 7A, a vehicle is running under a manual control by a driver at time T1 (example of first time), and the vehicle is running in the full self-driving automation mode at time T2 (example of second time) after time T1. In this case, the information acquisition unit 110 acquires, at time T1, first vehicle information "manual driving mode" indicating that the vehicle is running in the manual driving mode, and acquires, at time T2, second vehicle information indicating that the vehicle is running in the automatic driving mode. The judgment unit 120 compares these two pieces of vehicle information and judges that there is the predetermined change by regarding the change from "manual driving mode" to "automatic driving mode" as the predetermined change.

As described above, the change from the manual driving mode to the automatic driving mode is regarded as the predetermined change because this change in the state results in a change in the range that should be attentively looked at by the driver. That is, in the situation in which the vehicle is driven in the manual driving mode, the driver needs to attentively look ahead and thus the restricted area 60 is set in an area directly ahead of the driver's seat as illustrated in FIG. 7B. On the other hand, in the full automatic driving mode, the driver is released from driving the vehicle, and thus, as illustrated in FIG. 7C, the restricted area 60 is not necessary. Thus, when the judgment unit 120 judges that the predetermined change occurs in the vehicle information from "manual driving mode" to "automatic driving mode", the control unit 130 (described later) controls the image data 50 such that the restricted area 60 displayed in the manner as illustrated in FIG. 7B is deleted as illustrated in FIG. 7C. This allows an increase in degree of freedom associated with the location of the display information when the vehicle is driven in the automatic driving mode.

The vehicle information representing the vehicle driving mode may be generated based on information acquired via the in-vehicle LAN or the like. The vehicle information representing the vehicle driving mode may be judged or generated as required by a non-illustrated another constituent element.

Fifth Example of the Predetermined Change

In this example described below, the predetermined change is defined as a change from first vehicle information "driver's arousal level: high" to second vehicle information "driver's arousal level: low". FIG. 8A is a diagram illustrating a manner in which a driver drives a vehicle. FIG. 8C and FIG. 8C are diagrams illustrating a restricted area 60 of a display medium 20. Referring FIGS. 8A to 8C, the fifth example of the predetermined change is described below.

In FIG. 8A, the driver is in a high arousal level at time T1 (example of first time), and, at time T2 (example of second time), the driver is in an arousal level lower than the arousal level at time T1. In this case, the information acquisition unit 110 acquires, at time T1, first vehicle information "driver's arousal level: high" indicating that the driver in the high arousal level, and acquires, at time T2, second vehicle information "driver's arousal level: low" indicating that the driver in the low arousal level. The judgment unit 120 compares these two pieces of vehicle information and regards the change in driver arousal level from "high" to "low" as the predetermined change and thus judges that there is the predetermined change.

As described above, the change in driver's arousal level from a high state to a low state is regarded as the predetermined change for the following reason. In general, as the arousal level becomes lower, the point watched by the driver tends to focus on an area straight ahead of the driver, which makes it difficult for the driver to easily notice a change in the side circumstance. Therefore, in the case where judgment unit 120 judges that a change has occurred in vehicle information from "driver's arousal level: high" to "driver's arousal level: low", the control unit 130 (described later) controls the image data 50 such that the restricted area 60 illustrated in FIG. 8B is expanded as illustrated in FIG. 8C. This allows it to prevent the driver's watching from being concentrated on a distant point, and it becomes possible to prompt the driver to make a visual confirmation on safety over a wide range.

The vehicle information representing the driver's arousal level may be acquired, for example, by detecting the open level of an eyelid from an image of the driver captured by a driver monitoring camera and estimating the arousal level based on the detected open level of the eyelid. Alternatively, the arousal level may be estimated by detecting the open level of the eyelid determined by analyzing an electric signal output from an electrode attached to a head of the driver at a point close to a tail of the eye.

First to fifth examples of predetermined changes have been described above.

When the judgment unit 120 judges that a predetermined change has occurred, the judgment unit 120 outputs information to the control unit 130 to notify that the predetermined change has occurred.

Control Unit 130

When the judgment unit 120 judges that a predetermined change has occurred, the control unit 130 controls the image data such that the restricted area 60 of the display medium 20 is changed from the restricted area defined in relation to the first information associated with the predetermined matter to the restricted area defined in relation to the second information associated with the predetermined matter. That is, the control unit 130 controls the image data 50 such that the configuration parameters (at least one of the location, the size, and the shape) of the restricted area 60 is changed from the configuration parameters defined in relation to the first vehicle information to that defined in relation to the second vehicle information, that is, at least one of the location, the size, and the shape defined in relation to the first vehicle information is changed to that defined in relation to the second vehicle information. In other words, when an image is displayed on the display medium, the control unit 130 controls the display unit 200 such that a predetermined image representing an image 30 indicating notification information is generated and displayed on the display medium in an area outside a second restricted area (i.e., in the area which is outside the second restricted area and in which it is allowed to display information) which is defined in advance in relation to a second predetermined state and which is different from a first restricted area in terms of at least one of the location, the size, the number, and the shape.

The control unit 130 is described in further detail below. First, when the control unit 130 receives, from the judgment unit 120, information indicating that a predetermined change has occurred, the control unit 130 acquires at least the second vehicle information from the judgment unit 120. Note that the control unit 130 may acquire the first vehicle information together with the second vehicle information from the judgment unit 120.

The control unit 130 controls the image data 50 such that at least one of the location, the size, and the shape of the current restricted area 60 (that is, at least one of the location, the size, and the shape defined in relation to the first vehicle information) is changed to at least corresponding one of the location, the size, and the shape defined in relation to the second vehicle information. Note that the vehicle information are related in advance to the location, the size, and the shape of the restricted area 60 and stored in a storage apparatus (for example, see FIG. 14). An example of correspondence between the vehicle information and the location, the size, and the shape of the restricted area 60 will be described later with reference to FIG. 9. Note that the storage apparatus may in installed in a server apparatus (not illustrated) capable of communicating with the system 1.

FIG. 9 illustrates an example of a table defining the correspondence between vehicle information and the location and the size (the shape is not illustrated herein) of the restricted area 60. Note that the location of the restricted area 60 is defined, for example, by coordinates of the center of the restricted area 60 Note that the location of the restricted area 60 may be defined by any reference point of the restricted area (for example, a point in the upper left corner of the restricted area 60), and the scope of the present embodiment is not limited to the examples described above.

In FIG. 9, for example, vehicle information "automatic driving mode" is set to "zero" for the size of the restricted area 60 (that is, the restricted area 60 is not defined). On the other hand, vehicle information "manual driving mode" is related to the restricted area 60 having a size of "one-half of the whole screen area". The whole screen area is, for example, the whole area of image data 50. Alternatively, the whole screen area may be the whole area of the display medium 20. In any of the two cases described above, the location of the restricted area 60 is not defined (in the table, each dash is used to express that there is no definition), but the location of the restricted area 60 may alternatively be defined, for example, as "area directly in front $(X_1, Y_1)$". By defining the correspondence in the above-described manner, it becomes possible to change the restricted area 60 from that illustrated FIG. 7B to that illustrated in FIG. 7C in the fourth example of the predetermined change described above.

In FIG. 9, for example, vehicle information "road: running straight" is set to have a size of "one-half of the total screen area" as the size of the restricted area 60. On the other hand, vehicle information "road: T-junction" is set to have a size of "two-thirds the total screen area" as the size of the restricted area 60. In any of the two cases described above, the location of the restricted area 60 is not defined. By defining the correspondence in the above-described manner, it becomes possible to change the restricted area 60 from that illustrated FIG. 5B to that illustrated in FIG. 5C in the second example of the predetermined change described above.

In FIG. 9, for example, vehicle information "driver's arousal level: high" and vehicle information "driver's arousal level: middle" are each set to have a size of "one-half of the total screen area" as the size of the restricted area 60. On the other hand, vehicle information "driver's arousal level: low" is set to have a size of "two-thirds the total screen area" as the size of the restricted area 60. In any of these cases described above, the location of the restricted area 60 is not defined. By defining the correspondence in the above-described manner, it becomes possible to change the restricted area 60 from that illustrated FIG. 8B to that illustrated in FIG. 8C in the fifth example of the predetermined change described above.

In FIG. 9, for example, for vehicle information "running straight", the location of the restricted area 60 is defined as "area directly in front $(X_1, Y_1)$". On the other hand, for vehicle information "running along right curve", the location of the restricted area 60 is defined as "right side: coordinates $(X_R, Y_R)$", and for vehicle information "running along left curve" the location of the restricted area 60 is defined as "left side: coordinates $(X_L, Y_L)$". In any of these cases, the size of the restricted area 60 is not defined, although the size of the restricted area 60 may be alternatively defined, for example, as "one-half of the total screen area". By defining the correspondence in the above-described manner, it becomes possible to change the restricted area 60 from that illustrated FIG. 4B to that illustrated in FIG. 4C in the first example of the predetermined change described above.

On the other hand, for vehicle information "running along right curve" and vehicle information "running along left curve", the location of the restricted area 60 may be defined such that the location varies depending on the degree of a curve (curvature).

In FIG. 9, for example, for vehicle information "signal: red", the location of the restricted area 60 is defined as "upper side $(X_U, Y_U)$", and the size of the restricted area 60 is defined as "one-sixth of the whole screen area". On the other hand, for vehicle information "signal: blue", the location of the restricted area 60 is defined as "area directly in front $(X_2, Y_2)$", and the size of the restricted area 60 is defined as "one-half of the whole screen area". In any of these cases, the location and the size of the restricted area are defined. By defining the correspondence in the above-described manner, it becomes possible to change the restricted area 60 from that illustrated FIG. 6B to that illustrated in FIG. 6C in the third example of the predetermined change described above.

In FIG. 9, for example, for vehicle information "right turn/left turn (blinker operated)", the size of the restricted area 60 is defined as "two-thirds of the whole screen area", and the location of the restricted area 60 is not defined. By defining the correspondence in the above-described manner, it becomes possible to change the restricted area 60 from that illustrated FIG. 5B to that illustrated in FIG. 5C in the second example of the predetermined change described above.

As described above with reference to FIG. 9, the restricted area 60 is defined for each piece of vehicle information such that only the location of the restricted area 60, or only the size of the restricted area 60, or both the location and the size of the restricted area 60 are defined depending on the vehicle information. Note that the definition is made according to the design specifications of the apparatus, and the scope of the present embodiment is not limited by these examples.

The control unit 130 controls the image data 50 so as to change at least one of the location, the size, and the shape of the restricted area 60 according to the table illustrated in FIG. 9. That is, the control unit 130 generates the image data 50 such that display information 30 is not included in the restricted area 60. In a case where the vehicle information includes a plurality of elements, the control unit 130 controls the image data 50 based on a combination of the location and/or the size of the restricted area 60 related to the plurality of elements. The controlling performed by the control unit 130 is described in further detail below with reference to specific examples. In the following examples, fur convenience of explanation, it is assumed by way of example that the control is performed based on the table illustrated in FIG. 9, and only the location and the size of the restricted area 60 are taken into account in the control.

First Example of Control

For example, in a case where the first vehicle information indicates "manual driving mode, running straight", the control unit 130 controls the image data 50 such that the location of the restricted area 60 is set at "area directly in front $(X_1, Y_1)$", and the size is set to "one-half of the whole screen size". Let it be assumed that a change occurs after that from the first vehicle information to second vehicle information indicating that "manual driving mode, running along right curve". In this case, a change occurs in one of the two elements of the vehicle information. Thus, the control unit 130 controls the image data 50 such that the location of the restricted area 60 is changed to "right side: coordinates $(X_R, Y_R)$", while the size of the restricted area 60 is maintained at "one-half of the whole screen area".

Second Example of Control

For example, in a case where the first vehicle information indicates "manual driving mode, running straight", the control unit 130 controls the image data 50 such that the location of the restricted area 60 is set at "area directly in front $(X_1, Y_1)$", and the size is set to "one-half of the whole screen size". Let it be assumed that a change occurs after that from the first vehicle information to second vehicle information indicating that "automatic driving mode, running along left curve". In this case, a change occurs in both of the two elements of the vehicle information. Thus, the control unit 130 controls the image data 50 such that the location of the restricted area 60 is changed to "left side: coordinates $(X_L, Y_L)$", and the size of the restricted area 60 is changed to "zero". In a case where the vehicle information includes "automatic driving mode", the design specifications may be set such that controlling is not performed in terms of the other elements.

Third Example of Control

For example, in a case where the first vehicle information indicates "manual driving mode, road: running straight, signal: blue", the control unit 130 controls the image data 50 such that the location of the restricted area 60 is set at "area directly in front $(X_2, Y_2)$", and the size is set to "one-half of the whole screen size". Let it be assumed that a change occurs after that from the first vehicle information to second vehicle information indicating that "manual driving mode, road: T-junction, signal: red". In this case, a change occurs in two of the three elements of the vehicle information. Thus, the control unit 130 controls the image data 50 such that the location of the restricted area 60 is changed to "upper side $(X_U, Y_U)$". Note that there is a difference in size of the restricted area 60 among the sizes related to the respective three elements of the vehicle information. That is, the "one-half of the whole screen area" is assigned to the "manual driving mode", the "two-thirds of the whole screen area" is assigned to the "road: T-junction", and the "one-sixth of the whole screen area" is assigned to the "signal: red". The determination as to which location and which size are employed depends on the design specifications, and the scope of the present embodiment is not limited thereto. From the point of view of safe vehicle driving, it is desirable to select a location and a size that provide the highest safety. Thus, in the above example, it is desirable to select the "two-thirds of the whole screen area" assigned to the "road: T-junction" as the size of the restricted area 60.

The controlling performed by the control unit 130 has been described above with reference to some examples. Note that these examples are shown by way of example but not limitation. In controlling the image data 50, the control unit 130 controls not only the restricted area 60 but also, for example, the display information 30 (for example, character information such as warning information, navigation information, entertainment information, and/or the like) included in the image data 50. More specifically, the control unit 130 controls the location, the size, the range, the brightness, the color, and/or transparency of the display information 30 included in the image data 50.

In the present embodiment, a calibration is performed in advance on the restricted area 60 defined on the display medium 20 and an area corresponding to the restricted area 60 defined on image data 1000. Herein the image data 1000 refers to image data which is not yet projected onto the display medium 20. That is, as illustrated in FIG. 10, a calibration is performed in advance on the restricted area 60 defined on the display medium 20 and an area 1001 corresponding to the restricted area 60 defined on image data

1000. A method of defining of the correspondence between the restricted area 60 and the area 1001, and a method of performing the calibration are known, and thus a further description thereof is omitted.

In the examples described above, it is assumed that the shape of the restricted area 60 is rectangular. However, the shape is not limited to the rectangle, and the shape of the restricted area 60 may be circular, elliptic, or any other shapes.

As described above, although not illustrated in the figures, the shape of the restricted area 60 may be defined in the table in FIG. 9 for each piece of vehicle information. In this case, the control unit 130 may control the image data 50 such that the restricted area 60 is changed only in terms of the shape or together with the location and/or the size. For example, when the predetermined change is found between the first vehicle information and the second vehicle information, the control unit 130 controls the image data 50 such that the shape (for example, the rectangle) assigned to the restricted area 60 corresponding to the first vehicle information is changed to a shape (for example, an ellipse) assigned to the restricted area 60 corresponding to the second vehicle information.

Figure 11:
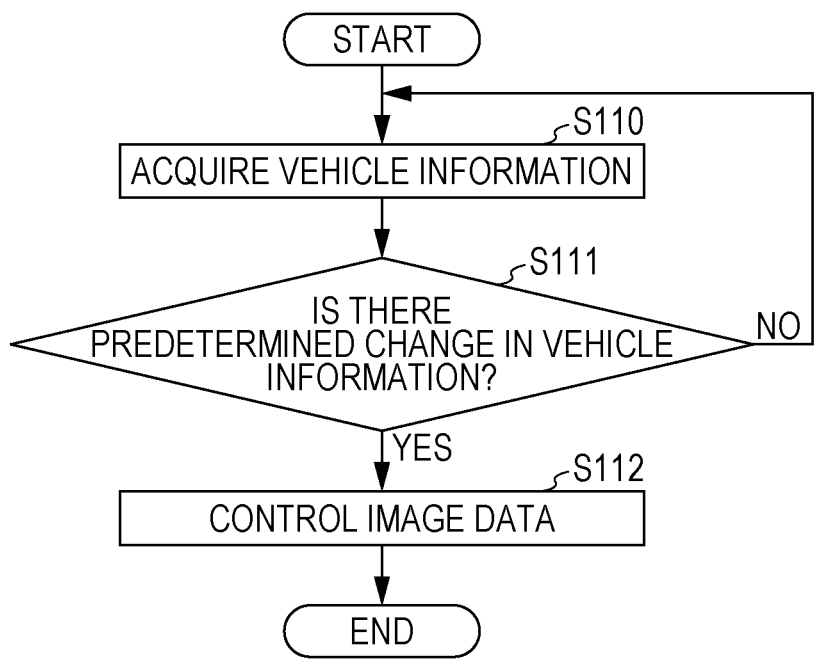
FIG. 11 is a flow chart illustrating an example of an operation of a display control apparatus according to an embodiment of the present disclosure.

The configuration of the display control apparatus 100 according to the present embodiment has been described above. Next, an example of an operation of the display control apparatus 100 is described below with reference to a flow chart illustrated in FIG. 11.

In step S110, the information acquisition unit 110 acquires the first vehicle information at first time (for example, at time T1 described above), acquires the second vehicle information at second time (for example, at time T2 described above) later than the first time.

In step S111, the judgment unit 120 judges whether there is a predetermined change (for example, one of the first to fifth examples of changes described above) between the first vehicle information and the second vehicle information. In a case where the judgment indicates that there is no predetermined change (the answer to step S111 is No), the processing flow returns to step S110. On the other hand, in a case where the judgment indicates that there is a predetermined change (the answer to step S111 is Yes), the processing flow proceeds to step S112.

In step S112, the control unit 130 controls the image data 50 such that at least one of the location, the size, and the shape of the restricted area 60 which is an area of the display medium 20 in which projecting of the display information 30 included in the image data 50. That is, the control unit 130 controls the image data 50 such that at least one of the location, the size, and the shape of the restricted area 60 assigned to the first vehicle information is changed to at least one of the location, the size, and the shape of the restricted area 60 assigned to the second vehicle information.

As described above, in the display control apparatus 100 according to the present embodiment, a judgment is performed as to whether there is a predetermined change in time-series vehicle information acquired, and if a predetermined change is found, at least one of the location, the size, and the shape of the restricted area 60 defined in advance in relation to first vehicle information acquired at a previous time is changed to at least one of the location, the size, and the shape of the restricted area 60 defined in advance in relation to second vehicle information acquired at a later time. Thus, the display control apparatus 100 is capable of, depending on the situation, preventing the user's front view from being blocked while keeping an area in which information is displayed.

In the above description of the display control apparatus 100 according to the present embodiment, it is assumed that the display control apparatus 100 is configured as illustrated in FIG. 2. However the configuration is not limited to that illustrated in FIG. 2. For example, as illustrated in FIG. 15, a display control system 2 may include an acquisition unit 140, a detection unit 150, a display control apparatus 1500, and a display unit 200, and a display control apparatus 1500 may include a judgment unit 120 and a control unit 130. Note that the detection unit 150 is similar in function to the information acquisition unit 110 as described above.

In the display control system 2 illustrated in FIG. 15, the acquisition unit 140 is configured to acquire notification information to be notified to a driver 40 of a vehicle, the detection unit 150 is configured to detect a predetermined state of at least one of the vehicle and the driver 40, the display unit 200 is configured to generate a predetermined image (image data) based on the notification information acquired via the acquisition unit 140 and project the predetermined image (image data) onto the display medium 20, and the display control apparatus 1500 is connected to the units described above.

In the display control apparatus 1500, in a case where the detection unit 150 detects a first predetermined state at a first time, the control unit 130 controls the display unit 200 such that when the predetermined image is displayed on the display medium 20, the predetermined image is generated so as to represent an image 30 indicating the notification information and is projected onto the display medium 20 such that the image 30 is displayed in an area other than a first restricted area 60, of the display medium 20, defined in advance in relation to the first predetermined state. On the other hand, when the detection unit 150 detects a second predetermined state different from the first predetermined state at a second time later than the first time, the judgment unit 120 judges whether there is a predetermined change between the first predetermined state and the second predetermined state. In a case where the judgment unit 120 judges that the predetermined change has occurred, the control unit 130 controls the display unit 200 such that when the predetermined image is displayed on the display medium 20, the predetermined image is generated so as to represent an image 30 indicating the notification information and is projected onto the display medium 20 such that the image 30 is displayed in an area other than a second restricted area 60 defined in advance in relation to the second predetermined state and being different from the first restricted area 60 in terms of at least one of the location, the size, the number, and the shape. Herein, the restricted area 60 is an area of the display medium 20 in which displaying of notification information is limited, and the other area of the display medium 20 other than the restricted area is an area (allowed area) outside the restricted area 60 in which displaying of notification information is allowed.

The function of each unit is described below.

The acquisition unit 140 acquires notification information to be notified to a driver 40 of a vehicle. The notification information is display information 30 to be presented to the driver 40 of the vehicle. That is, the notification information is part of the image data 50 and is viewed as a virtual image by the driver 40. The notification information is, for example, a message indicating a warning of a possible collision with a vehicle ahead, a message calling attention to a pedestrian ahead, entertainment information, vehicle information associated with a speed of the vehicle or the like, a AR display on an obstacle located ahead or a destination or the like, navigation information, and/or the like. The notification information may be given in the form of a graphical image, a character, a symbol, or a combination thereof.

The detection unit 150 detects a predetermined state of at least one of the vehicle and the driver 40. Note that the detection unit 150 has a function similar to that of the information acquisition unit 110.

As described above, in the case where the detection unit 150 detects the first predetermined state at the first time, the control unit 130 controls the display unit 200 such that the predetermined image is generated so as to represent the image 30 indicating the notification information and is projected onto the display medium 20 (not illustrated). The notification information is recognized by the driver 40 as a virtual image displayed in an area other than the first restricted area 60 which is an area, on the display medium 20, defined in advance in relation to the first predetermined state.

When the judgment unit 120 judges that the predetermined change has occurred, the control unit 130 controls the display unit 200 such that the predetermined image is generated so as to represent an image 30 indicating the notification information and is projected onto the display medium 20 such that the image 30 is displayed in an area other than a second restricted area 60 defined in advance in relation to the second predetermined state and being different from the first restricted area 60 in terms of at least one of the location, the size, the number, and the shape. The control unit 130 has been described in detail above.

On the other hand, when the detection unit 150 detects a second predetermined state different from the first predetermined state at a second time later than the first time, the judgment unit 120 judges whether there is a predetermined change between the first predetermined state and the second predetermined state. When the judgment unit 120 judges that a predetermined change has occurred, the judgment unit 120 outputs information to the control unit 130 to notify that the predetermined change has occurred.

As described above, the predetermined change is a specific change in the traffic environment, a specific change in the vehicle state, or a specific change in the driver's state, or a combination thereof. That is, the predetermined change is a change in the traffic environment, the vehicle state, or the driver's state or a combination thereof in response to which it is necessary to change the configuration parameters of the restricted area 60.

In a case where as a result of the process in response to the detection of the second predetermined state by the detection unit 150, if the image 30 indicating the first notification information displayed in the area other than the first restricted area 60 is included in the second restricted area 60, the control unit 130 may control the display unit 200 such that the predetermined image is generated and projected onto the display medium 20 such that the image 30 representing the first notification information is moved from the second restricted area 60 into an area other than the second restricted area 60.

On the other hand, in a case where the detection unit 150 detects a third predetermined state different from the second predetermined state at a third time later than the second time, the judgment unit 120 judges whether there is a predetermined change between the second predetermined state and the third predetermined state. In a case where the judgment unit 120 judges that the predetermined change has occurred, the control unit 130 may control the display unit 200 such that the predetermined image is generated so as to represent an image 30 indicating the first notification information and is projected onto the display medium 20 such that the image 30 is displayed in an area other than the third restricted area 60 defined in advance in relation to the third predetermined state and being different from the second restricted area 60 in terms of at least one of the location, the size, the number, and the shape. Furthermore, in a case where the image 30 representing the first notification information at first time is displayed on the display medium 20 such that the location of the displayed image 30 is in an area other than the third restricted area 60, then in a case where the judgment unit 120 judges that the predetermined change has occurred, the control unit 130 may control the display unit 200 such that the predetermined image is generated so as to represent the image 30 indicating the first notification information and is projected onto the display medium 20 such that the image 30 is displayed at the location where the image 30 indicating the first notification information was displayed at the first time.

In a case where the size of the second restricted area 60 is substantially equal to the size of the display medium 20, the control unit 130 may control the display unit 200 such that the predetermined image is generated and displayed onto the display medium 20 such that the image 30 representing the first notification information is not displayed on the display medium 20.

In a case where the acquisition unit 140 acquires first notification information and second notification information different from the first notification information, the control unit 130 may control the display unit 200 such that the predetermined image is generated so as to represent an image 30 representing the first notification information and an image 30 representing the second notification information and is projected onto the display medium 20 such that the image 30 representing the first notification information and the image 30 representing the second notification information are displayed in an area other than the first restricted area. In a case where when the image 30 representing the first notification information and the image 30 representing the second notification information are displayed on the display medium 20 at the first time, the displayed locations are included in the second restricted area 60, then when the judgment unit 120 judges that the predetermined change has occurred, the control unit 130 may control the display unit 200 such that the predetermined image is generated so as to represent the image 30 indicating the first notification information and the image 30 indicating the second notification information and is projected onto the display medium 20 such that the image 30 indicating the first notification information is displayed in an area other than the second restricted area 60 and the image 30 indicating the second notification information is displayed at the location where the image 30 indicating the second notification information was displayed at the first time.

Alternatively, the control unit 130 may control the display unit 200 such that the predetermined image is generates so as to represent the image 30 indicating the second notification information changed in terms of at least one of the color, the transparency, and the luminance, and the generated predetermined image is displayed on the display medium 20 such that the image 30 is displayed at the locate where the image 30 indicating the second notification information was displayed at the first time.

The predetermined state indicates an automatic driving level of the vehicle, and the automatic driving level is one of a plurality of prescribed levels from a level in which all operations necessary in driving are performed by a driver of a vehicle to a level in which automatic driving is performed without the driver of the vehicle having to perform any operation necessary in driving. The predetermined change between the first automatic driving level and the second automatic driving level may be a change between levels in the plurality of levels.

The edge of the restricted area 60 may be indicated with a solid line, a dotted line, a broken line, a chain line, or a wavy line, projected onto the display medium 20.

The display control system 20 has been described in detail above.

Note that in a case where the display medium 20 in the system 1 is a glasses-type display medium, and a user is walking with the system 1 functioning as a glasses-type apparatus, the information acquisition unit 110 acquires information about a situation ahead of the walking user. The determination unit then compares the first information associated with the predetermined matter acquired at first time and the second information associated with the predetermined matter acquired at second time. Herein, the information on a particular matter is, for example, the information about the situation ahead of the walking user. In a case where the judgment unit 120 judges that there is a predetermined change between the first information associated with the predetermined matter and the second information associated with the predetermined matter, the control unit 130 controls the image data such that the configuration parameters of the restricted area 60 on the glasses-type display medium is changed. Herein the predetermined change in the case where the glasses-type display medium is used is, for example, a change that occurs when a bicycle is approaching the user from the forward direction at a speed equal to or higher than a predetermined value, a change that occurs when another person is approaching the user from the forward direction, which may result in a collision.

The present disclosure is not limited to the examples described above, but various modifications are possible without departing from the spirit and the scope of the present disclosure. Some examples of modifications are described below.

First Example of Modification

In this example described below, in a case where when the restricted area 60 is changed from that assigned to the first vehicle information to that assigned to the second vehicle information, if the display information 30 falls within the changed restricted area 60, then the control unit 130 controls the image data 50 such that the display information 30 is projected in an area outside the changed restricted area 60. For example, in a case where the restricted area 60 is expanded from that illustrated in FIG. 12A to that illustrated in FIG. 12B, if the location to which the display information 30 is projected is maintained at that illustrated in FIG. 12A, then the display information 30 is included in the restricted area 60 in FIG. 12B, which causes the front view of the driver 40 to be blocked. In the present example, to handle the situation described above, the control unit 130 controls the image data 50 such that in response to expanding of the restricted area 60 from the state illustrated in FIG. 12A, the display information 30 is pushed in the expanding direction (to the left in the example illustrated in FIG. 12B) by the expanding restricted area 60 (hereinafter, this is referred to as "moving control"). As a result, in illustrated in FIG. 12B, the pushed display information 30 is displayed in an area outside the restricted area 60. Thus it is possible to prevent the font view of the driver 40 from being blocked by the display information 30. Note that the direction in which the display information 30 is pushed is not limited to the direction in which the restricted area 60 is expanded. In the example described above, it is assumed that the size of the restricted area 60 is expanded. The control may be performed in a similar manner also in a case where the location or the shape of the restricted area 60 is changed.

Second Example of Modification

This example of mediation described below is associated with an operation performed following the move control in the first example of modification. For example, after the restricted area 60 and the display information 30 are changed from the state illustrated in FIG. 12A to the state illustrated in FIG. 12B, if third vehicle information with the same content as that of the first vehicle information is acquired at third time, the control unit 130 controls the image data 50 such that the display information 30 projected in the area outside the changed restricted area 60 is returned to the projection position assigned to the third vehicle information (that is, to the original projection position assigned to the first vehicle information). Note that the third time is a timing later than the second time. That is, when the third vehicle information is acquired in the state illustrated in FIG. 12B, the control unit 130 returns the restricted area 60 and the display information 30 to the state illustrated in FIG. 12B to the state illustrated in FIG. 12A.

Third Example of Modification

In this example of modification, instead of the moving control the first example of modification, controlling is performed such that the display information 30 is not projected (hereinafter, referred to as deleting control). That is, in a case where when the restricted area 60 is changed from that assigned to the first vehicle information to that assigned to the second vehicle information, if the display information 30 falls within the changed restricted area 60, the control unit 130 controls the image data 50 such that the display information 30 projected on the display medium 20 is deleted. Note that in a case where after the display information 30 is deleted, if the third vehicle information described above is acquired, then the control described in the second example of modification may be performed.

Fourth Example of Modification

The outline of the restricted area 60 may be projected such that the outline is visible by the driver 40. For example, the outline of the restricted area 60 may be indicated with a solid line, a dotted line, a broken line, a chain line, or a wavy line.

Fifth Example of Modification

The display information to be subjected to the moving control in the first example of medication or the deleting control in the third example of medication may be classified according to its attribute. For example, classes of the display information are defined in advance according to types of the display information as follows. Display information to be subjected to the moving control is classified into a first type, and display information not to be subjected to the moving control is classified into a second type. Examples of the first type display information include entertainment information, navigation information, and other information which is not urgent. Examples of the second type display information include warning information, alarm information, and other urgent information.

FIG. 13A illustrates an example of a manner in which display information is displayed on the display medium 20 when the first vehicle information is acquired. As illustrated in FIG. 13A, display information 30 and display information 31 are projected in an area outside the restricted area 60. The display information 30 is information of the first type, and the display information 31 is information of the second type. In the state illustrated in FIG. 13A, in a case where a judgment is made that there is a predetermined change between the first vehicle information and the second vehicle information, the control unit 130 controls the restricted area 60 so as to expand it to the left. As a result of the expansion, the display information 30 and the display information 31 are included in the expanded restricted area 60, and thus the control unit 130 determines whether the display information 30 and the display information 31 being projected are respectively of the first type or the second type.

The display information 30 is determined as being of the first type, and thus the control unit 130 performs the moving control on the display information 30. As a result, the display information 30 is pushed in the direction in which the restricted area 60 is expanded in the manner as described in the first example of modification such that the display information 30 is projected in an area outside the restricted area 60 as illustrated in FIG. 13B.

On the other hand, the display information 31 is determined as being of the second type, and thus the control unit 130 does not perform the moving control on the display information 31. As a result, the display information 31 remains within the restricted area 60 as illustrated in FIG. 13B.

The criterion for classifying the display information 30 is not limited to the type of information. For example, the display information 30 may be classified according to attributes such as color, brightness, or the like that attract an attention of the driver.

Sixth Example of Modification

The sixth example described below is associated with the operation of the fifth example of modification. In a case where the display information 30 is information of the second type, the control unit 130 may control the image data 50 such that at least one of the color, the transparency, and the luminance of the display information 30 is changed.

Seventh Example of Modification

In a case where the judgment unit 120 detects a predetermined change, the control unit 130 may control the image data 50 such that the restricted area 60 is divided into a plurality of sub-areas. For example, in a case where a change occurs from the first vehicle information "signal: blue" to the second vehicle information "signal: red", the control unit 130 may divide the restricted area 60 located immediately ahead of the driver 40 into two parts on right and left sides of the display medium 20 while maintaining the total area unchanged.

Eighth Example Modification

In a case where the judgment unit 120 detects a predetermined change, the control unit 130 may set control parameters such as a speed of moving the display information 30 (a speed at which the display information moves), a response speed (timing of starting moving the display information), and/or the like based on correlation in location or size of the restricted area between before and after the occurrence of the change of the restricted area. More specifically, the relative size of the restricted area is increased, for example, when a situation occurs in which the driver 40 should pay attention to the surrounding environment as in a case in which the vehicle is approaching a curve or a T-junction. Thus the speed of moving the display information is set to be high or the response speed is set to be short. On the other hand, the relative size of the restricted area is reduced, for example, when the situation where the driver should pay attention is over as is the case where a curve or a T-junction has been passed through. If the display information 30 is moved quickly or in a short response time in such a situation, this will annoy the driver. Therefore, when the relative size of the restricted area is reduced, the display information 30 is moved slowly or in a long response time, which makes it possible to control the display information without annoying the driver 40 with the quick motion.

The present disclosure has been described in detail below above with reference to embodiments and examples of modifications in conjunction with drawings. Note that the functions of the respective units in the display control apparatus 100 may be realized using a computer program.

Figure 14:
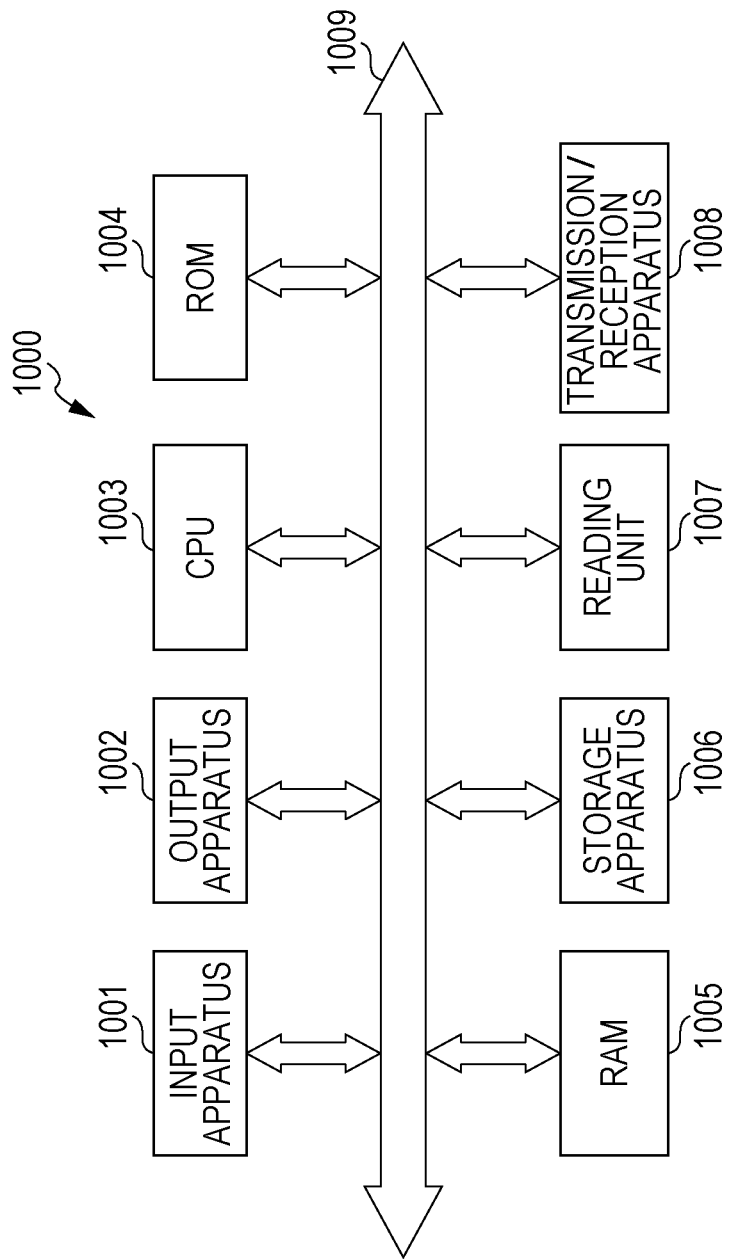
FIG. 14 is a block diagram illustrating an example of a hardware configuration of a display control apparatus according to an embodiment of the present disclosure.

FIG. 14 illustrates a hardware configuration of a computer capable of providing various functions of the display control apparatus 100 by executing a program. The computer 1000 includes an input apparatus 1001 such as a keyboard, mouse, a touch pad, or the like, an output apparatus 1002 such as a display medium 20, a speaker, or the like, a central processing unit (CPU) 1003, a read only memory (ROM) 1004, a random access memory (RAM) 1005, a storage apparatus 1006 such as a hard disk apparatus, a solid state drive (SSD), or the like, a reading unit 1007 configured to read information from a storage medium such as an a digital versatile disk read only memory (DVD-ROM), an universal serial bus (USB) memory, or the like, and a transmission/reception apparatus 1008 configured to perform communication via a network. The above-described apparatuses/units are connected to each other via a bus 1009.

The reading unit 1007 reads the program, that allows it to realize the above-described various functions of the display control apparatus, from the storage medium and stores the read program in the storage apparatus 1006. Alternatively, the transmission/reception apparatus 1008 may download the program, that allows it to realize the above-described various functions of the display control apparatus, from a server by performing communication with the server connected to the network, and the downloaded program may be stored in the storage apparatus 1006.

The CPU 1003 copies the program from the storage apparatus 1006 into the RAM 1005, and sequentially reads and executes instructions included in the program copied in the RAM 1005 thereby realizing the various functions of the display control apparatus. When the program is executed, information acquired in various processes described above in the embodiments is stored in the RAM 1305 and/or the storage apparatus 1306 and the information is used as necessary.

As can be seen from the above description, the present disclosure is useful to realize the display control apparatus capable of controlling displaying of information provided to a user (such as a driver of a vehicle, a user wearing a displaying device, or the like), the display control method, the display control program, and the projection apparatus.

What is claimed is:

1. A display control apparatus associated with a vehicle that controls image data displayed on a predetermined display medium to an occupant of the vehicle, comprising:
    a memory that stores instructions;
    a processor that, when executing the instructions stored in the memory, performs operations including
        acquiring a first information at a first time and acquiring a second information at a second time after the first time;
        judging whether there is a predetermined change between the first information associated with the predetermined matter and the second information;
        controlling the image data such that in a case where the predetermined change is detected, a first restricted area and a second restricted area where the displaying of display information included in the image data is limited on the display medium, the first restricted area defined in relation to the first information is changed to the second restricted area defined in relation to the second information, the second restricted area is different from the first restricted area in terms of at least one of a location, a size, a number, and a shape; and outputting the controlled image data to the predetermined display medium for viewing by the occupant of the vehicle, wherein the display information is information belonging to one of a first type or a second type and in a case where a change of the first restricted area causes the display information not to be displayed within the second restricted area, the processor controls the image data such that in a case where the display information is information belonging to the first type, the display information is displayed in an allowed area located outside the second restricted area, while in a case where the display information is information belonging to the second type, the location where the display information is displayed is maintained.

2. The display control apparatus according to claim 1, wherein in a case where the change of the first restricted area causes the display information to be displayed within the second restricted area, the processor controls the image data such that the display information is displayed in an allowed area located outside the second restricted area.

3. The display control apparatus according to claim 2, wherein in a case where after the second information is acquired, a third information with the same content as the content of the first information is acquired, the processor controls the image data such that the display information displayed in the allowed area located outside the second restricted area is returned to a location where the first information was originally displayed.

4. The display control apparatus according to claim 1, wherein in a case where the change of the first restricted area causes the display information to be displayed within the second restricted area, the processor controls the image data such that the display information is deleted from the display medium.

5. The display control apparatus according to claim 1, wherein the processor controls the image data such that an outline of the restricted area is displayed with one of a solid line, a dashed-line, a broken line, a chain line, and a wavy line on the display medium.

6. The display control apparatus according to claim 1, wherein in a case where the display information is information belonging to the second type, the processor controls the image data such that at least one of color, transparency, and luminance of the display information is changed.

7. The display control apparatus according to claim 1, wherein in a case where the predetermined change is detected, the processor controls the image data such that the first restricted area is divided into a plurality of sub-areas.

8. A method for displaying control image data associated with a vehicle on a predetermined display medium for viewing by an occupant of the vehicle, the method comprising:

acquiring a first information at a first time and a second information at a second time after the first time;

making a judgment whether there is a predetermined change between the first information and the second information;

controlling the image data such that in a case where the predetermined change is detected, a first restricted area where the displaying of display information included in the image data is limited on the display medium, the first restricted area being defined in relation to the first information is changed to a second restricted area defined in relation to the second information, the second restricted area is different from the first restricted area in terms of at least one of a location, a size, a number, and a shape; and outputting the controlled image data to the predetermined display medium for viewing by the occupant of the vehicle, wherein the display information is information belonging to one of a first type or a second type, and in a case where a change of the first restricted area causes the display information not to be displayed within the second restricted area, controlling the image data such that in a case where the display information is information belonging to the first type, the display information is displayed in an allowed area located outside the second restricted area, while in a case where the display information is information belonging to the second type, the location where the display information is displayed is maintained.

9. A display control apparatus in a display system associated with a vehicle, including a sensor that detects a predetermined state of at least one of the vehicle and a driver, and a display that generates a predetermined image based on a first notification information, the display control apparatus comprising:

a memory that stores instructions;

a processor that, when executing the instructions stored in the memory, performs operations including controlling the display such that in a case where the sensor detects a first predetermined state at a first time, a first predetermined image for representing the first notification information is generated and outputted to a display medium for viewing by the driver such that the first predetermined image is displayed in an area outside the first restricted area, wherein the first restricted area is an area defined in advance in relation to the first predetermined state; and making a judgment such that in a case where the sensor detects a second predetermined state different from the first predetermined state at a second time later than the first time, the processor judges whether there is a predetermined change between the first predetermined state and the second predetermined state, wherein in a case where the processor judges that there is the predetermined change, the processor controls the display such that a second predetermined image for representing the first notification information is generated and is outputted to the display medium for viewing by the driver such that the second predetermined image is displayed in an area outside the second restricted area on the display medium, wherein the second restricted area is an area defined in advance in relation to the second predetermined state, and the second restricted area is different from the first restricted area in terms of at least one of a location, a size, a number, and a shape, and wherein the display information is information belonging to one of a first type or a second type, and in a case where a change of the first restricted area causes the display information not to be displayed within the second restricted area, controlling the image data such that in a case where the display information is information belonging to the first type, the display information is displayed in an allowed area located outside the second restricted area, while in a case where the display information is information belonging to the second type, the location where the display information is displayed is maintained.

10. A projection apparatus, comprising:
the display control apparatus according to claim 9, and the display.

11. A method for a display system associated with a vehicle including a processor that acquires a first notification information to be notified to a driver of the vehicle, a sensor that detects a predetermined state of at least one of the vehicle and the driver, and a display that generates a predetermined image based on the first notification information acquired via the processor, the method comprising:
controlling the display such that in a case where the sensor detects a first predetermined state at a first time, a first predetermined image for representing the first notification information is generated and outputted to a display medium for viewing by the driver such that the first predetermined image is displayed in an area outside the first restricted area, wherein the first restricted area is an area defined in advance in relation to the first predetermined state;
making a judgment such that in a case where the sensor detects a second predetermined state different from the first predetermined state at a second time later than the first time, the judgment is made as to whether there is a predetermined change between the first predetermined state and the second predetermined state; and
controlling the display such that in a case where it is judged that there is the predetermined change, a second predetermined image for representing the first notification information is generated and is outputted to the display medium for viewing by the driver such that the second predetermined image is displayed in an area outside the second restricted area on the display medium,
wherein the second restricted area is an area defined in advance in relation to the second predetermined state, and the second restricted area is different from the first restricted area in terms of at least one of a location, a size, a number, and a shape,
wherein further making a judgment such that in a case where the sensor detects a third predetermined state different from the second predetermined state at a third time later than the second time, the judgment is made as to whether there is a predetermined change between the second predetermined state and the third predetermined state; and
controlling the display such that in a case where it is judged that there is the predetermined change, a third predetermined image for representing the first notification information is generated and is outputted to the display medium for viewing by the driver such that the third predetermined image is displayed in an area outside a third restricted area on the display medium,
wherein the third restricted area is an area defined in advance in relation to the third predetermined state, and the third restricted area is different from the first restricted area in terms of at least one of a location, a size, a number, and a shape.

12. The method according to claim 11,
wherein controlling the display such that in a case where the detection of the second predetermined state by the sensor causes the first predetermined image for representing the first notification information displayed in the area outside the first restricted area to be included within the second restricted area, a second predetermined image for representing the first notification information is displayed on the display medium such that the image representing the first notification information is moved from the inside of the second restricted area to an area outside the second restricted area.

13. The method according to claim 11, further comprising:
controlling the display such that in a case where it is judged that there is the predetermined change in a state in which the location where image representing the first notification information is displayed on the display medium at the first time is in an area outside the third restricted area, a third predetermined image for representing the first notification information is generated and outputted to the display medium such that the third predetermined image is displayed at the location where the image representing the first notification information was displayed at the first time.

14. The method according to claim 11,
wherein the outline of the restricted area is indicated with a solid line, a dotted line, a broken line, a chain line, or a wavy line, on the display medium.

15. The method according to claim 11, further comprising:
controlling the display such that in a case where the size of the second restricted area is substantially equal to the size of the display medium, the image representing the first notification information is deleted from the display medium.

16. A method for a display system associated with a vehicle including a processor that acquires a first notification information to be notified to a driver of the vehicle, a sensor that detects a predetermined state of at least one of the vehicle and the driver, and a display that generates a predetermined image based on the first notification information acquired via the processor, the method comprising:
controlling the display such that in a case where the sensor detects a first predetermined state at a first time, a first predetermined image for representing the first notification information is generated and outputted to a display medium for viewing by the driver such that the first predetermined image is displayed in an area outside the first restricted area, wherein the first restricted area is an area defined in advance in relation to the first predetermined state;
making a judgment such that in a case where the sensor detects a second predetermined state different from the first predetermined state at a second time later than the first time, the judgment is made as to whether there is a predetermined change between the first predetermined state and the second predetermined state; and
controlling the display such that in a case where it is judged that there is the predetermined change, a second predetermined image for representing the first notification information is generated and is outputted to the display medium for viewing by the driver such that the second predetermined image is displayed in an area outside the second restricted area on the display medium, wherein the second restricted area is an area defined in advance in relation to the second predetermined state, and the second restricted area is different from the first restricted area in terms of at least one of a location, a size, a number, and a shape; and controlling the display such that in a case where the processor acquires the first notification information and second notification information different from the first notification information, an image indicating the first notification information in an area outside the first restricted area and a third predetermined image representing an image indicating the second notification information are generated and outputted to the display medium for viewing by the driver, and in a state in which the image indicating the first notification information and the image indicating second notification information are displayed at the first time at a location included in the second restricted area, if it is judged that the predetermined change is detected, then a fourth predetermined image for representing an image indicating the first notification information and the image indicating the second notification information is generated and outputted to the display medium for viewing by the driver such that the image indicating the first notification information is displayed in an area outside the second restricted area and the image indicating the second notification information is displayed at the location where the image indicating the second notification information was displayed at the first time.

17. The method according to claim 16,
wherein the image indicating the second notification information of the fourth predetermined image is changed in terms of at least one of color, transparency, and luminance.

18. A method for a display system including a processor that acquires a first notification information to be notified to a driver of a vehicle, a sensor that detects a predetermined state of at least one of the vehicle and the driver, and a display that generates a predetermined image based on the first notification information acquired via the processor, the method comprising:

controlling the display such that in a case where the sensor detects a first predetermined state at a first time, a first predetermined image for representing the first notification information is generated and outputted to a display medium such that the first predetermined image is displayed in an area outside the first restricted area, wherein the first restricted area is an area defined in advance in relation to the first predetermined state;

making a judgment such that in a case where the sensor detects a second predetermined state different from the first predetermined state at a second time later than the first time, the judgment is made as to whether there is a predetermined change between the first predetermined state and the second predetermined state; and controlling the display such that in a case where it is judged that there is the predetermined change, a second predetermined image for representing the first notification information is generated and is displayed on the display medium such that the second predetermined image is displayed in an area outside the second restricted area on the display medium, wherein the second restricted area is an area defined in advance in relation to the second predetermined state, and the second restricted area is different from the first restricted area in terms of at least one of a location, a size, a number, and a shape, wherein the predetermined state indicates one of automatic driving levels of the vehicle, a plurality of automatic driving levels are prescribed from a level in which all operations necessary in driving are performed by a driver of the vehicle to a level in which automatic driving is performed without the driver of the vehicle having to perform any operation necessary in driving, and the predetermined change between the first automatic driving level and the second automatic driving level is a change between one of the plurality of levels and another one of the plurality of levels.

19. A non-transitory, tangible computer-readable storage medium storing display control program to be executed by a computer in a display system associated with a vehicle, the display system including a processor that acquires a first notification information to be notified to a driver of the vehicle, a sensor that detects a predetermined state of at least one of the vehicle and the driver, and a display that generates a predetermined image based on the first notification information acquired via the processor, the display control program configured to cause the computer to execute a process, the process comprising:

controlling the display such that in a case where the sensor detects a first predetermined state at a first time, a first predetermined image for representing the first notification information is generated and outputted to a display medium for viewing by the driver such that the first predetermined image is displayed in an area outside the first restricted area, wherein the first restricted area is an area defined in advance in relation to the first predetermined state;

making a judgment such that in a case where the sensor detects a second predetermined state different from the first predetermined state at a second time later than the first time, the judgment is made as to whether there is a predetermined change between the first predetermined and the second predetermined state; and controlling the display such that in a case where it is judged that there is the predetermined change, a second predetermined image for representing the first notification information is generated and is outputted to the display medium for viewing by the driver such that the second predetermined image is displayed in an area outside the second restricted area on the display medium, wherein the second restricted area is an area defined in advance in relation to the second predetermined state, and the second restricted area is different from the first restricted area in terms of at least one of location, size, number, and shape, and wherein the display information is information belonging to one of a first type or a second type, and in a case where a change of the first restricted area causes the display information not to be displayed within the second restricted area, controlling the image data such that in a case where the display information is information belonging to the first type, the display information is displayed in an allowed area located outside the second restricted area, while in a case where the display information is information belonging to the second type, the location where the display information is displayed is maintained.

* * * * *